US006679550B2

United States Patent
Goor et al.

(10) Patent No.: US 6,679,550 B2
(45) Date of Patent: Jan. 20, 2004

(54) CHILD SAFETY SEAT

(75) Inventors: Dan Goor, Colorado Springs, CO (US); David F. Clement, Colorado Springs, CO (US); Kris Alan Arnott, Colorado Springs, CO (US)

(73) Assignee: XSCI, Inc., Colorado Springs, CO (US)

( * ) Notice: Subject to any disclaimer, the term of this patent is extended or adjusted under 35 U.S.C. 154(b) by 0 days.

(21) Appl. No.: 10/145,384

(22) Filed: May 14, 2002

(65) Prior Publication Data
US 2002/0175544 A1 Nov. 28, 2002

Related U.S. Application Data

(63) Continuation-in-part of application No. 09/515,434, filed on Feb. 29, 2000, now Pat. No. 6,386,632, which is a continuation-in-part of application No. 09/170,383, filed on Oct. 13, 1998, now Pat. No. 6,042,181.
(60) Provisional application No. 60/358,560, filed on Feb. 21, 2002.

(51) Int. Cl.⁷ ................................................ B60N 2/28
(52) U.S. Cl. ................................ 297/216.11; 292/250.1
(58) Field of Search ....................... 297/216.11, 216.13, 297/216.14, 250.1, 256.16, 184.13

(56) References Cited

U.S. PATENT DOCUMENTS

| 3,861,742 | A |   | 1/1975  | Leonard et al. ......... 297/216.11 |
| 3,934,934 | A | * | 1/1976  | Farrell et al. ............... 297/467 |
| 4,039,225 | A | * | 8/1977  | Tomforde .................... 297/488 |
| 4,681,368 | A |   | 7/1987  | Heath et al. ................. 297/250 |
| 4,707,024 | A |   | 11/1987 | Schrader ................. 297/256.14 |
| 4,790,593 | A | * | 12/1988 | Davalos et al. ........... 297/250.1 |
| 5,385,385 | A | * | 1/1995  | Silverman ................. 297/250.1 |
| 5,409,292 | A |   | 4/1995  | Kain et al. ................ 297/183.1 |
| 5,468,014 | A |   | 11/1995 | Gimbel et al. ....... 297/216.11 X |
| 5,524,965 | A |   | 6/1996  | Barley .................... 297/256.16 |
| 5,556,162 | A |   | 9/1996  | Raffini ................... 297/256.15 |
| 5,716,095 | A |   | 2/1998  | Lopez .................... 297/184.13 |
| 5,733,003 | A | * | 3/1998  | Goor ....................... 297/250.1 |
| 5,842,737 | A |   | 12/1998 | Goor ..................... 297/216.11 |
| 5,884,967 | A |   | 3/1999  | Gasper .................. 297/216.11 |

* cited by examiner

Primary Examiner—Peter R. Brown
(74) Attorney, Agent, or Firm—Weingarten, Schurgin, Gagnebin & Lebovici LLP

(57) ABSTRACT

The infant safety seat of the present invention provides improved occupant protection in all vehicles, especially in the front seat of vehicles equipped with a passenger-side airbag. The infant safety seat includes an air bag deflecting canopy, and dampening mechanisms to protect against the shock of airbag deployment and an impact. The safety seat comprises a base, adapted to be secured to a seat of the vehicle by a seat belt passed through an opening in the base and a cradle having a back portion and seat portion having sides and a handle attached across said sides. A latching mechanism incorporated in the base removably secures the cradle to the base by grasping an attachment element between the handle and sides. The cradle of the safety seat is removable utilizing a single-handed release mechanism to unlock the cradle from the base.

6 Claims, 21 Drawing Sheets

CHILD SAFETY SEAT

CROSS REFERENCE TO RELATED APPLICATIONS

This application claims priority under 35 U.S.C. §119(e) to U.S. provisional patent application Ser. No. 60/358,560 filed Feb. 21, 2002, and a continuation-in-part under 35 U.S.C. §120 to patent application Ser. No. 09/515,434 filed Feb. 29, 2000, entitled: CONVERTIBLE CHILD SAFETY SEAT, now U.S. Pat. No. 6,386,632 which is a continuation-in-part of patent application Ser. No. 09/170,383, filed Oct. 13, 1998, entitled: CONVERTIBLE CHILD SAFETY SEAT, now U.S. Pat. No. 6,042,181, the disclosures of all of which are incorporated herein by reference.

STATEMENT REGARDING FEDERALLY SPONSORED RESEARCH OR DEVELOPMENT

N/A

BACKGROUND OF THE INVENTION

Many states have passed laws that mandate the use of a child safety seat for children up to the age of four years old. Since 1999 all new automobiles and light trucks produced in the United States have been equipped with passenger-side airbags because of a federal mandate.

Although child seat manufacturers routinely warn purchasers to secure the child safety seat in the center of the rear-seat when there is an airbag in the car, it is not uncommon for the safety seat to be placed in the front, passenger-side seat. Rear-facing infants in the back seat, when alone with the driver, often cause distractions that contribute to, or cause, crashes. A distressed infant alone in a safety seat in the back seat of a car is at least as distracting to the driver as a cellphone, a well-established and quantified distraction. In addition, recent Government data shows that in numerous rear-end crashes, front seats break and hurt, or even kill, children in the back seat. If not for passenger side airbag, for the sake of safety, rearfacing infants should be placed in the front seat to minimize distractions contributing to crashes and to allow for infant/driver eye contact thus adding to the infant's feeling of security. In recognition of this fact, the U.S. Department of Transportation has recommended the installation of an airbag on/off switch in cars carrying infants or small children in the front seat. Still, there is risk to an infant in a rearfacing safety seat positioned in front of a passenger side air bag.

A significant body of data has shown that the interaction between a rear facing infant seat and a front passenger-side airbag can result in excessive head and chest acceleration, causing serious and perhaps fatal injury to the infant. For example, the airbag/seat interaction produces accelerations of an infant's head exceeding 100 G's at bag impact and Head Injury Criterion (HIC) values ranging from up to 3000 HIC. By contrast, rear facing seats not experiencing airbag interaction produce head accelerations of about 50 G's and HIC values less than 1000 and generally around 650 when crash tested at a standardized test speed of 48 km/hr. The Child Restraint Air Bag Interaction (CRABI) task force recommends 390 HIC as the top acceptable number for infant safety. One reason that it has not been possible to meet the HIC recommendations is that current infant restraint systems use hard plastics.

Further research has shown that in some cases there is an interaction between the rear facing infant seat installed in the back seat and a front passenger seat back. In the case of a rear collision, the impact causes the front passenger seat to collapse and come in contact with the infant seat, transmitting forces that need to be cushioned. Such forces can be greatly increased by the presence of a passenger in the front passenger seat Infants are usually transported in rear facing car seats and in many cases, it is desired to transport the infant to other locations such as a grocery cart, restaurant, etc. A handle is usually incorporated in the cradle to facilitate removal of the cradle from the car seat and to provide a convenient way to carry the cradle. Current methods to transport the infant have required removing the entire seat as one piece or have required that the cradle first be released from the frame using releases on both sides of the cradle and then the cradle be lifted from the frame. These motions have been awkward for parents.

It would therefore be desirable to provide an infant child safety seat that will protect the child when the safety seat is installed facing rearward in any seat in a vehicle, whether or not equipped with a passenger side airbag. The cradle should be easily removed from the car seat base, have an ergonomically designed handle and provide a infant safety seat that limits the shock transmitted to a child in the case of an impact.

SUMMARY OF THE INVENTION

The present invention improves upon previous attempts to overcome the disadvantages and dangers described above by providing improved occupant protection in all vehicles, with particular enhancement in vehicles equipped with a passenger-side airbag. The infant safety seat base includes a canopy to deflect an expanding air bag away from the infant and dissipate both the air bag and any impact energy.

The canopy further incorporates a shock absorbent foam barrier to absorb a significant portion of the deceleration and/or shock energies that might harm the child. The canopy is integrated with a base allowing the remaining energy to be dissipated by the base components by both deforming and by moving the base. The base includes a suspension system that suspends the cradle limiting the transmission of force between the base and the cradle. The suspension system includes a set of shock absorbers, where the front shock absorbers are identical and the rear shock absorbers are identical, but the front and rear absorbers differ in stiffness. The difference in stiffness is chosen to allow the installed cradle to rock toward the back canopy in response to an impact on the canopy.

The infant cradle is held in the base suspension assembly by a latching mechanism using gravity for engagement and using a single-handed release mechanism. The mechanism uses jaws that grip a structural element holding a handle to the cradle. The latching mechanism opens when the cradle is placed on the paws of the jaws and grips the structural element when the element has passed the paws. The single-handed release allows a person to release and lift the cradle without stretching across the seat to access the release mechanism because the release is operated from either side of the cradle and incorporates interlocks. The interlocks must be engaged prior to the release.

DESCRIPTION OF THE DRAWINGS

The invention will be more fully understood by reference to the following detailed description when considered in conjunction with the accompanying drawings, in which.

DETAILED DESCRIPTION OF THE INVENTION

Figure 1:
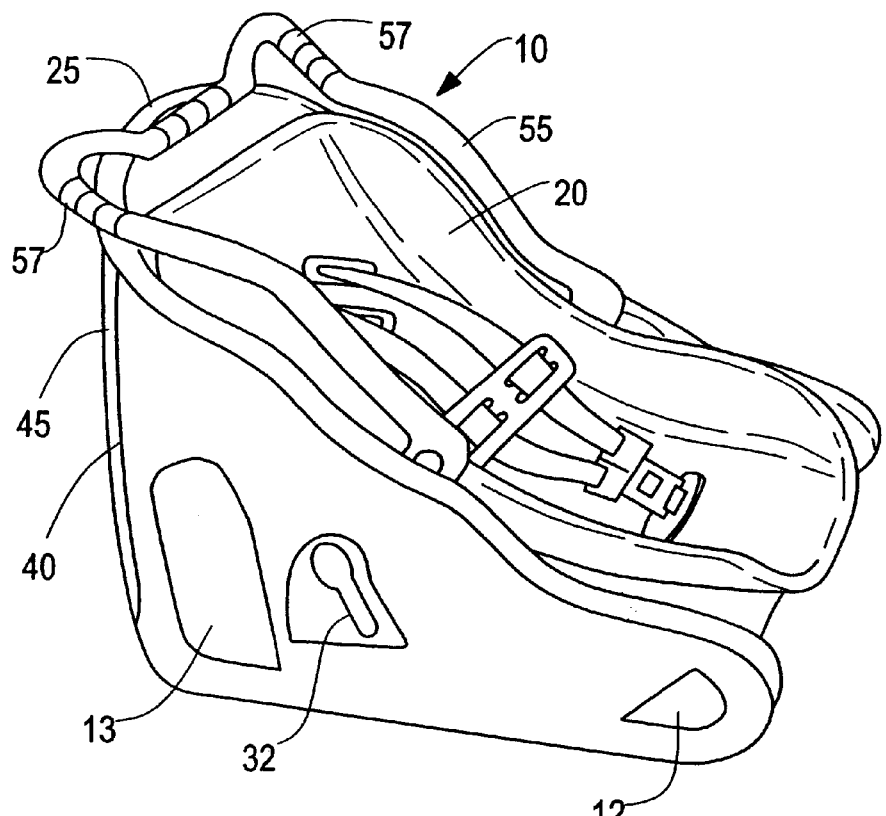
FIG. 1 is a view of the convertible child safety seat of the present invention.
Figure 3:
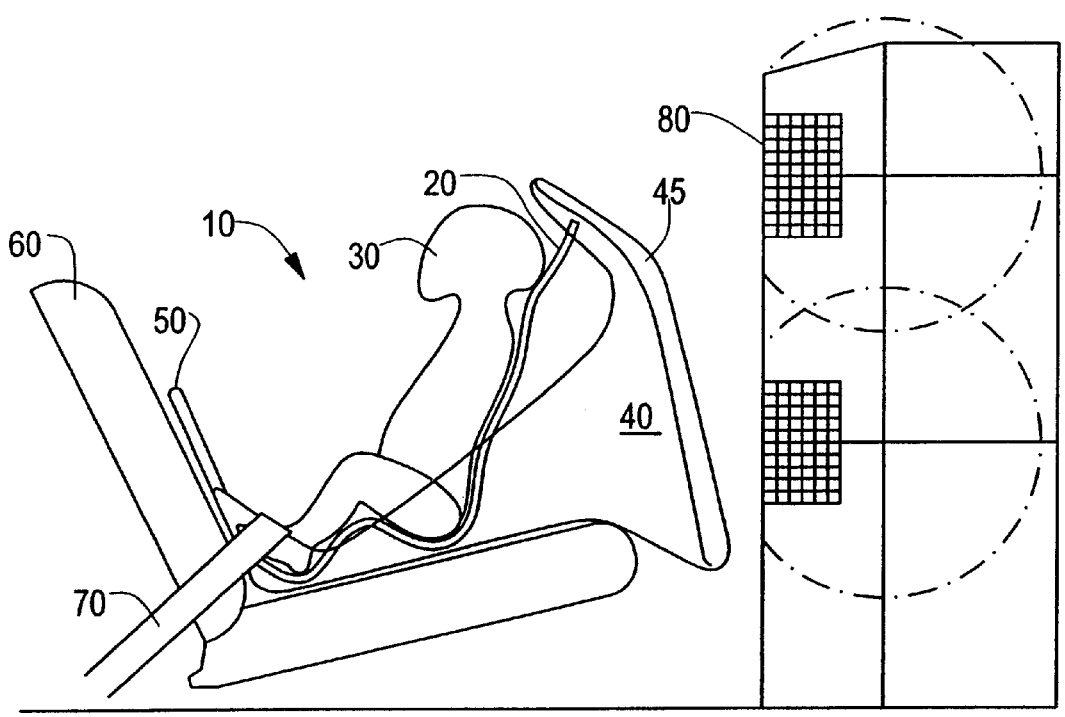
FIG. 3 is a diagrammatic side view of the child safety seat of the present invention in a rearward position installed in the front seat of a vehicle.
Figure 7:
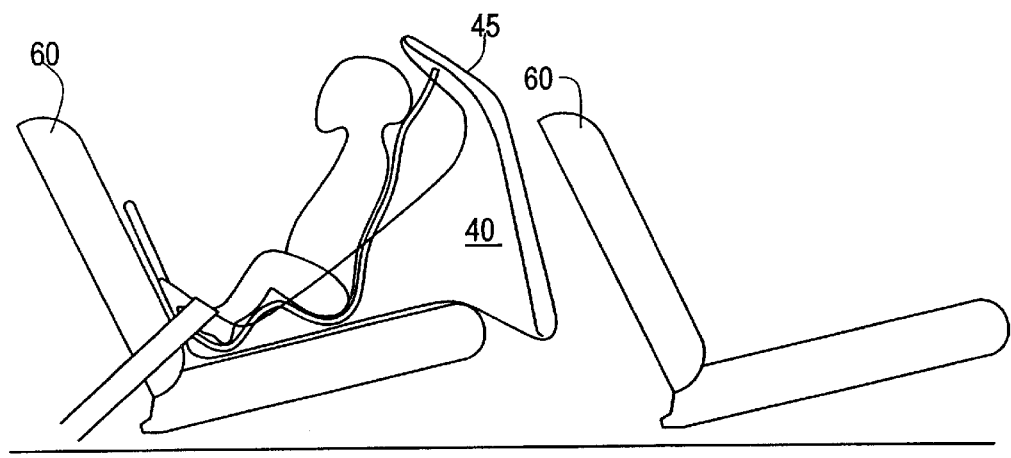
FIG. 7 is a diagrammatic side view of the child safety seat of the present invention in a rearfacing position installed in the rear seat of a vehicle.
Figure 8:
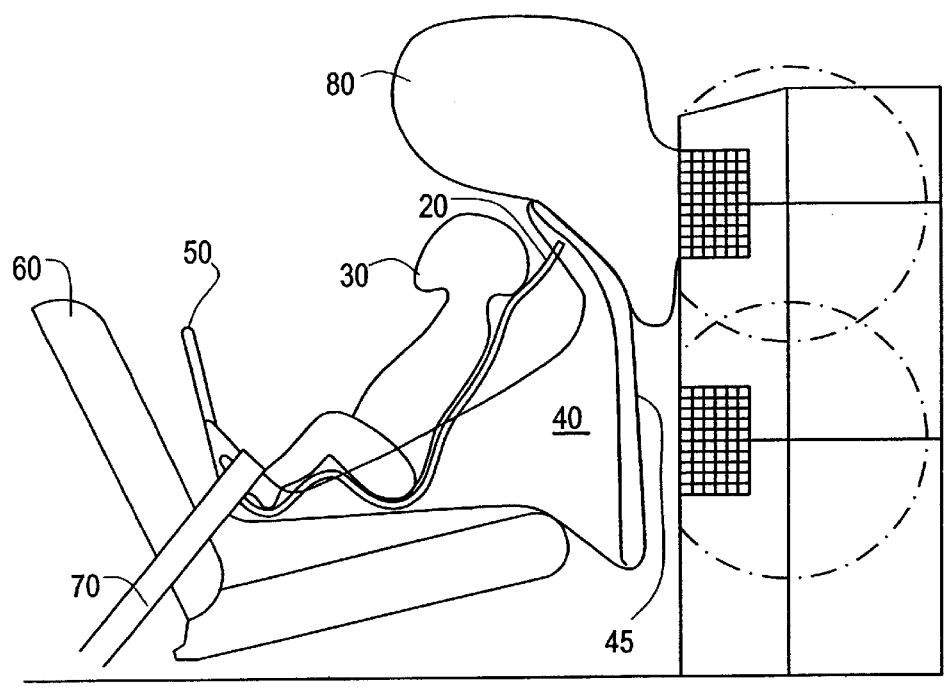
FIG. 8 is a diagrammatic side view of the child safety seat of FIG. 3 with the air bag fully inflated.
Figure 12:
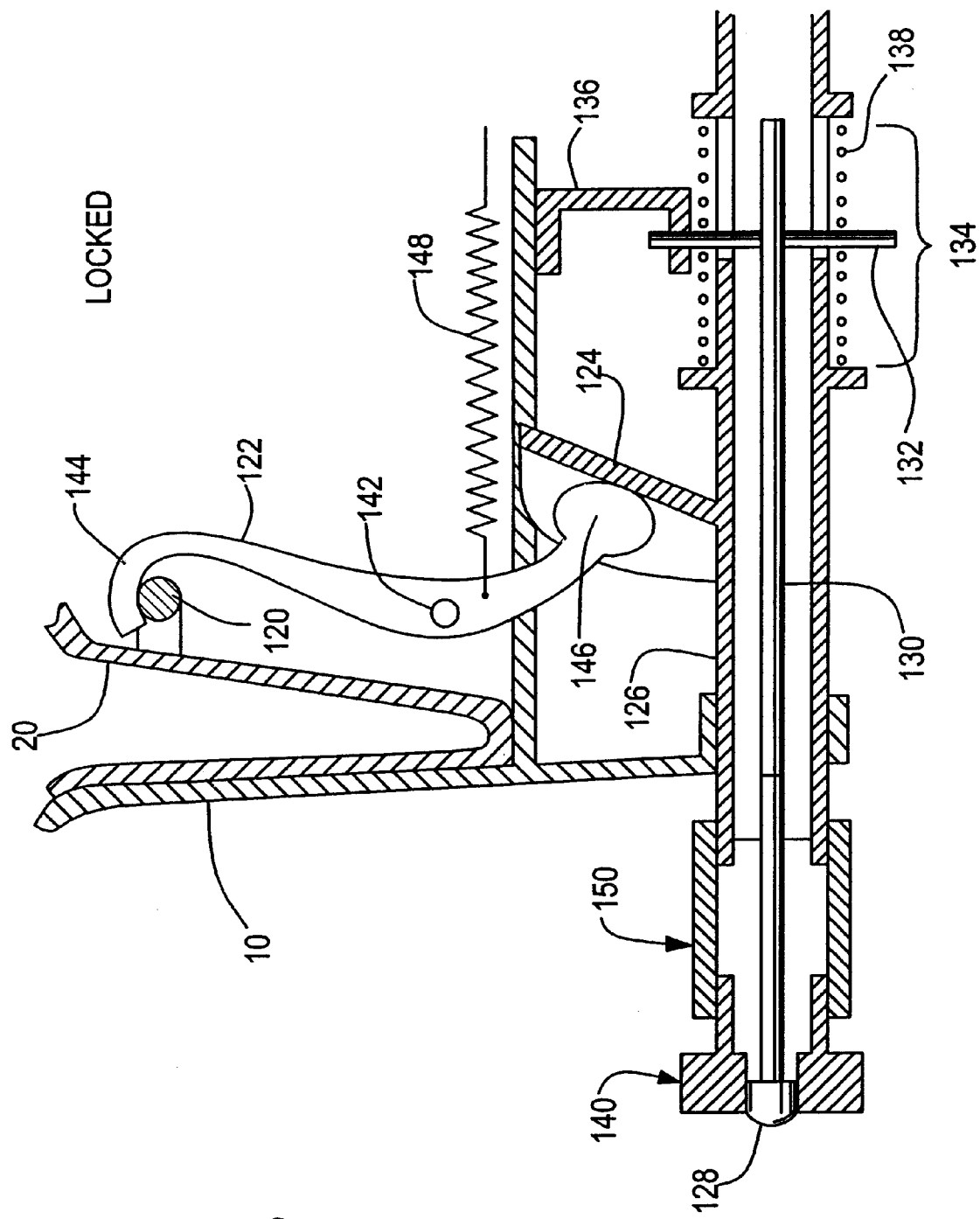
FIG. 12 is a detail side view of a release mechanism locked to hold a child safety seat.
Figure 13:
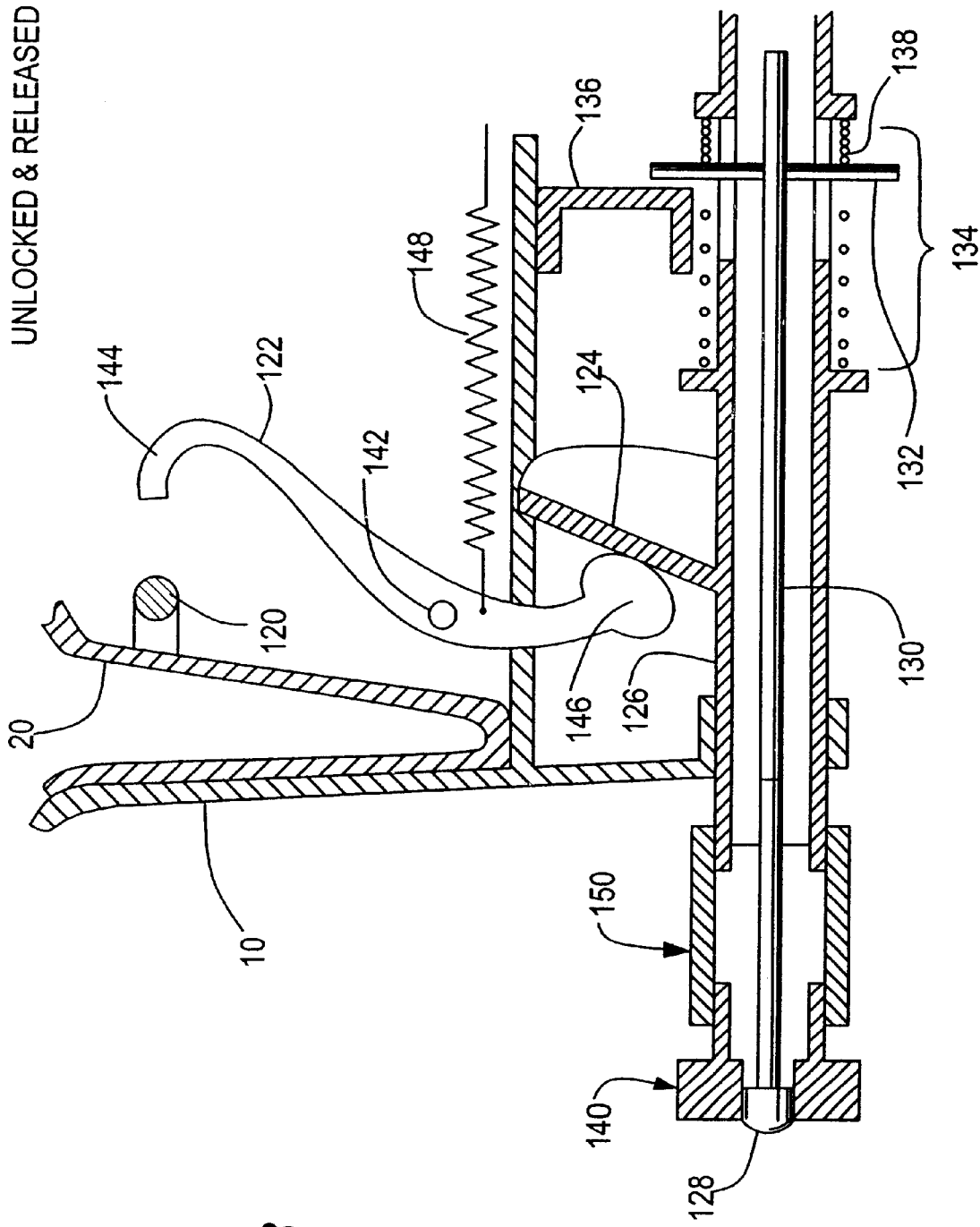
FIG. 13 is a detail side view of a release mechanism released to allow removal of a child safety seat.
Figure 14:
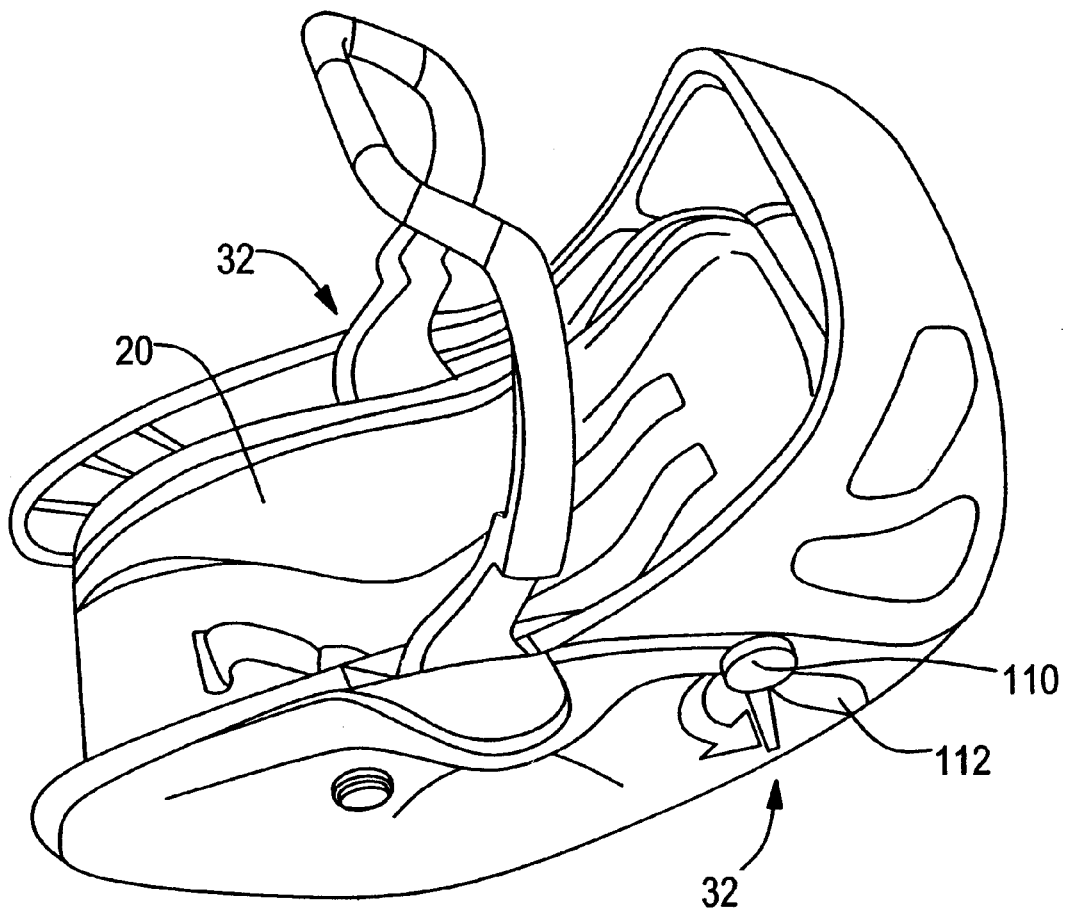
FIG. 14 is a side view of a mechanism for engaging the safety release mechanism using a single hand.
Figure 15:
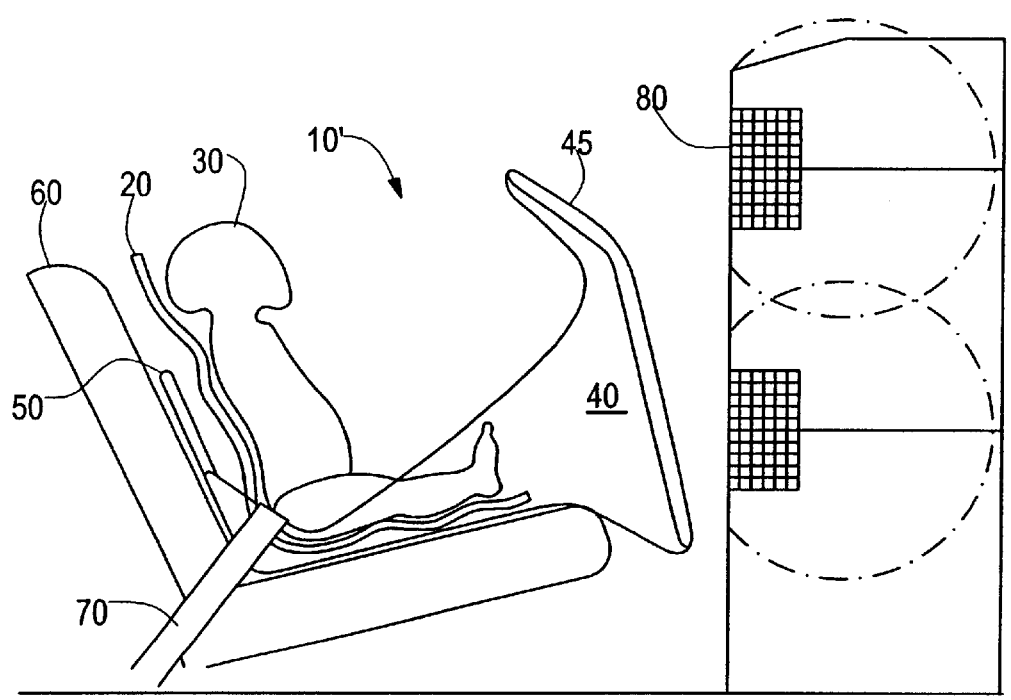
FIG. 15 is a diagrammatic side view of the child safety seat of the present invention in a forward position installed in the front seat of a vehicle.
Figure 16:
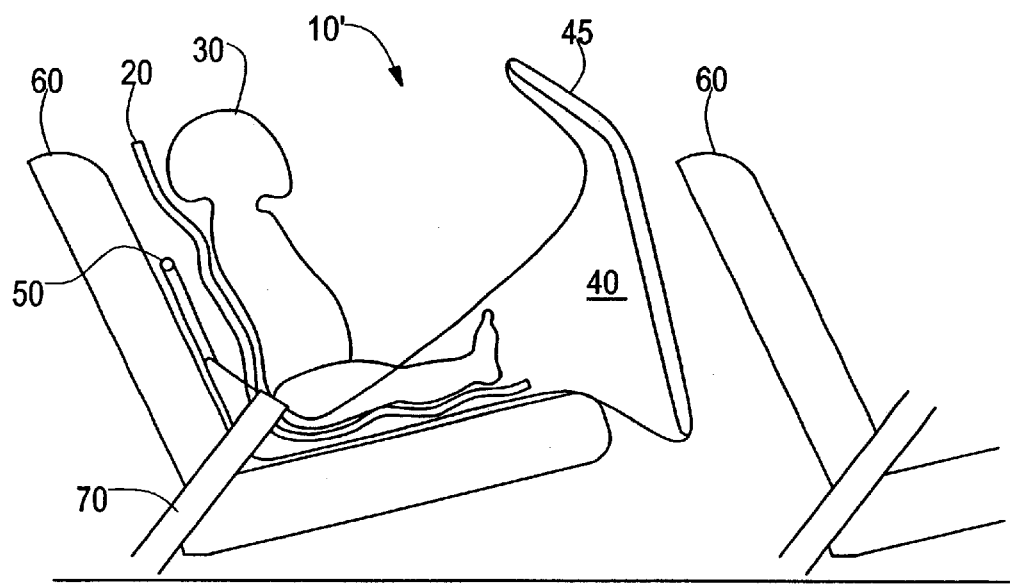
FIG. 16 is a diagrammatic side view of the child safety seat of the present invention in a forward position installed in the rear seat of a vehicle.

A removable infant/child safety seat that can be used with the child facing forward or the infant facing backward incorporates an advanced air bag deflector, improved handle and convenient release mechanism. Referring to FIG. 1, the seat 10 includes a frame 25 having a cradle 20 removably secured thereto. The seat 10 further comprises an airbag deflector 40, incorporating a crumple zone 45 that surrounds and is a part of the frame 25. The air bag deflector may be integrated as part of the frame or may be a separate element, which attaches to and surrounds a portion of the frame. The air bag deflector 40 is operative to deflect an expanding air bag away from an infant seated within the cradle 20 of the seat 10. The crumple zone of the air bag deflector absorbs a majority of the force imparted by the deploying air bag or by contact between the safety seat and part of the car. The air bag deflector/frame 40/25 both absorb and transfer the remainder of the force imparted to the safety seat to the vehicle seat. The removable cradle 20 can be installed within the frame 25 in a first position in which an infant seated within the safety seat would be facing rearward as shown in FIGS. 3, 7 and 8, or in a second position in which the child (one to three years old) 30 seated within the safety seat 10 would be facing forward as shown in FIGS. 14–16. The convertible car seat further includes a one-handed safety release 32 to disengage the cradle from the frame as illustrated in FIGS. 1, and 15–16. The cradle may further include a removable handle 55 with ergonomic integral grips 57 for carrying the cradle detached from the car seat frame as shown in FIGS. 12–14. The convertible car seat may further include an anti-kick bar 50 at the end of the frame 40 furthest from the airbag deflector shown in FIGS. 3, 7, 9, 10 and 11. The seat 10 also includes a front orifice 12 for allowing a seat belt to pass therethrough for securing the safety seat to the automobile passenger seat when the safety seat 10 is used in a rearward facing position, and a rear orifice 13 for allowing a seat belt to pass therethrough for securing the safety seat 10 to the automobile passenger seat when the safety seat 10 is used in a forward facing position.

Figure 2:
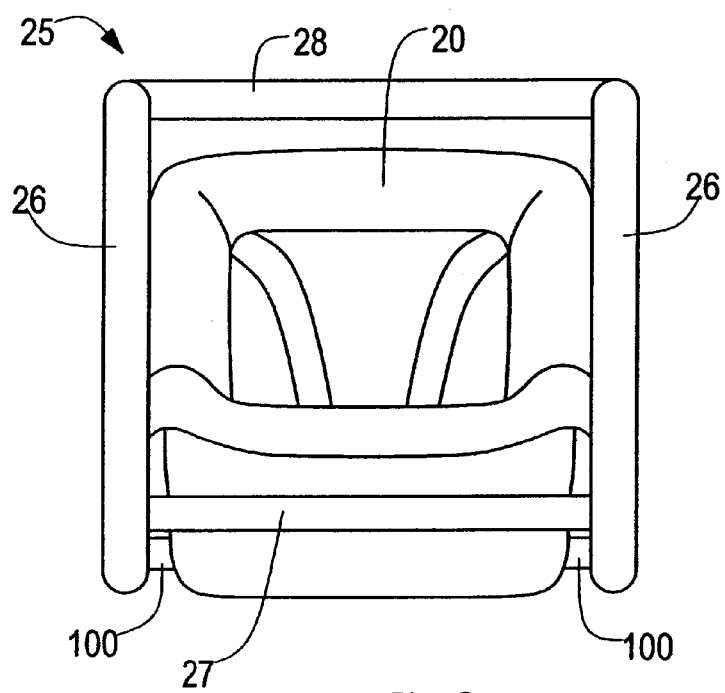
FIG. 2 is a front view of the frame and cradle of the child safety seat of FIG. 1.

Referring now to FIG. 2, a view of the frame and cradle only are presented. The frame 25 in this embodiment is comprised of sidepieces 26 that are generally parallel to each other, a top piece 28 and a bottom piece 27. The top piece 28 and bottom piece 27 mechanically interconnect the sidepieces 26 to each other. While a four piece frame is shown, it should be understood that a unitary frame or a frame comprising any number of pieces could also be utilized. The cradle 20 is mounted to the frame 25. Additionally, while the cradle is shown mounted to the frame, the cradle can be detached from the frame by any mechanisms known in the art. The mounting mechanism can include shock mounting components. It should be understood that any number of shock mounts, absorbent materials or shock mounting configurations including but not directly limited to mounts molded directly to the frame or cradle may be used to mount the cradle to the frame.

A rear facing convertible child seat installed for normal operation of the vehicle is shown in FIG. 3. The convertible child safety seat 10 with handle removed is shown installed in the passenger side front seat 60 of a motor vehicle. A seat belt 70 aids in securing the safety seat 10 to the front seat 60 of the vehicle. In this configuration, the airbag deflector 40 with crumple zone 45 faces the dashboard where airbags 80 are installed.

Figure 4:
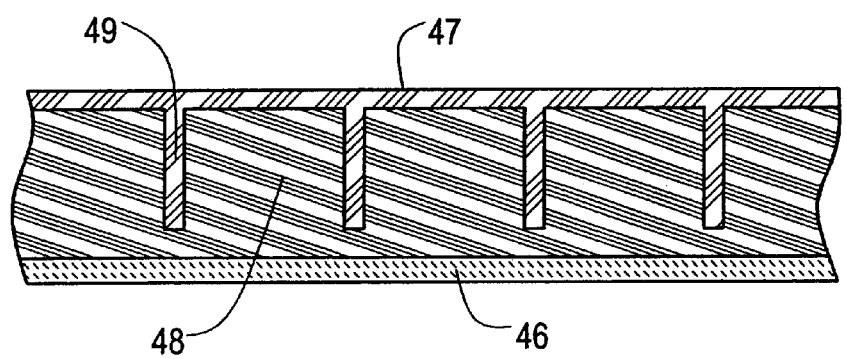
FIG. 4 is a partial cross-sectional view of the shock absorbent crumple zone along line IV—IV of FIG. 5.
Figure 5:
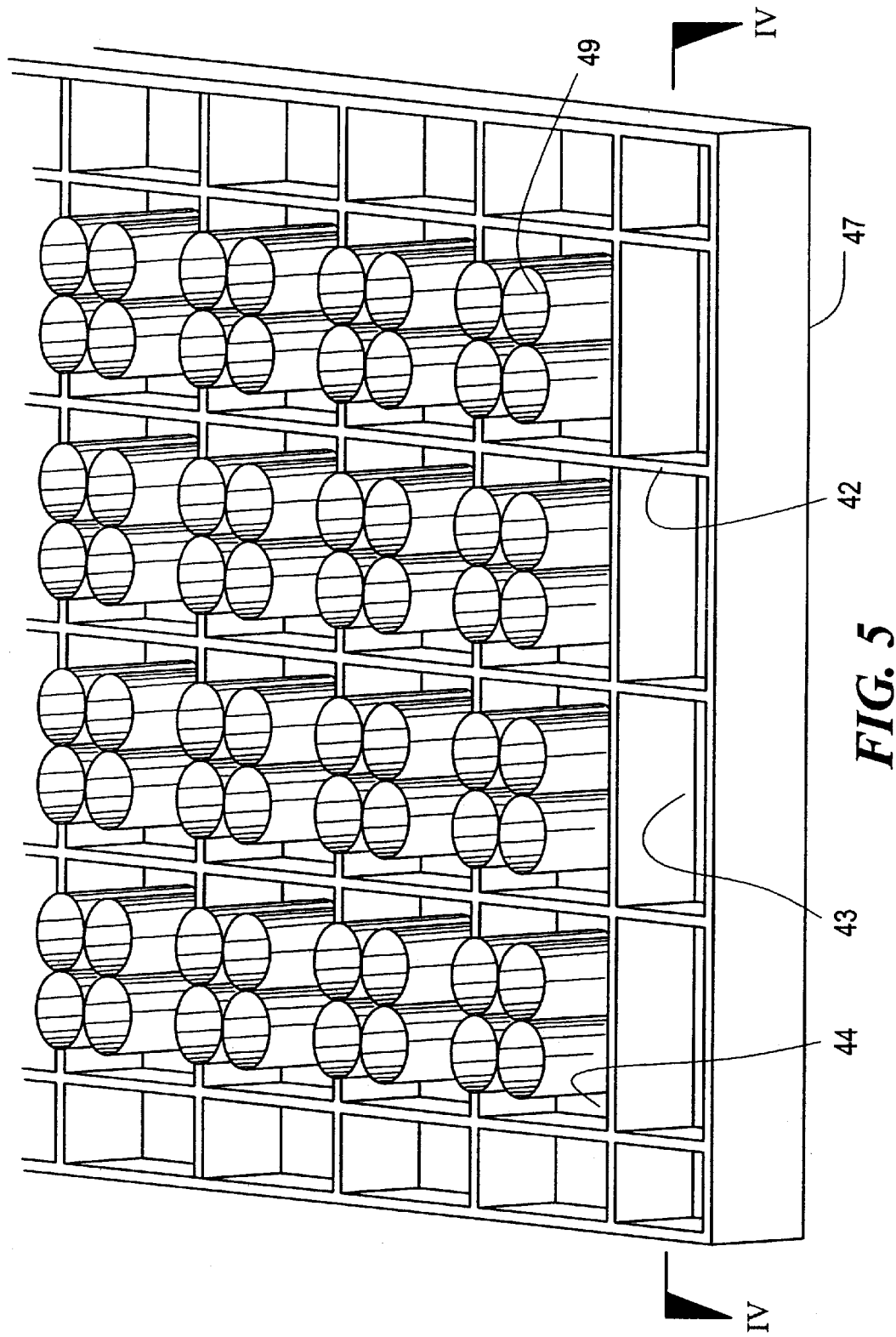
FIG. 5 is a diagram of the crumple zone of the invention.
Figure 6:
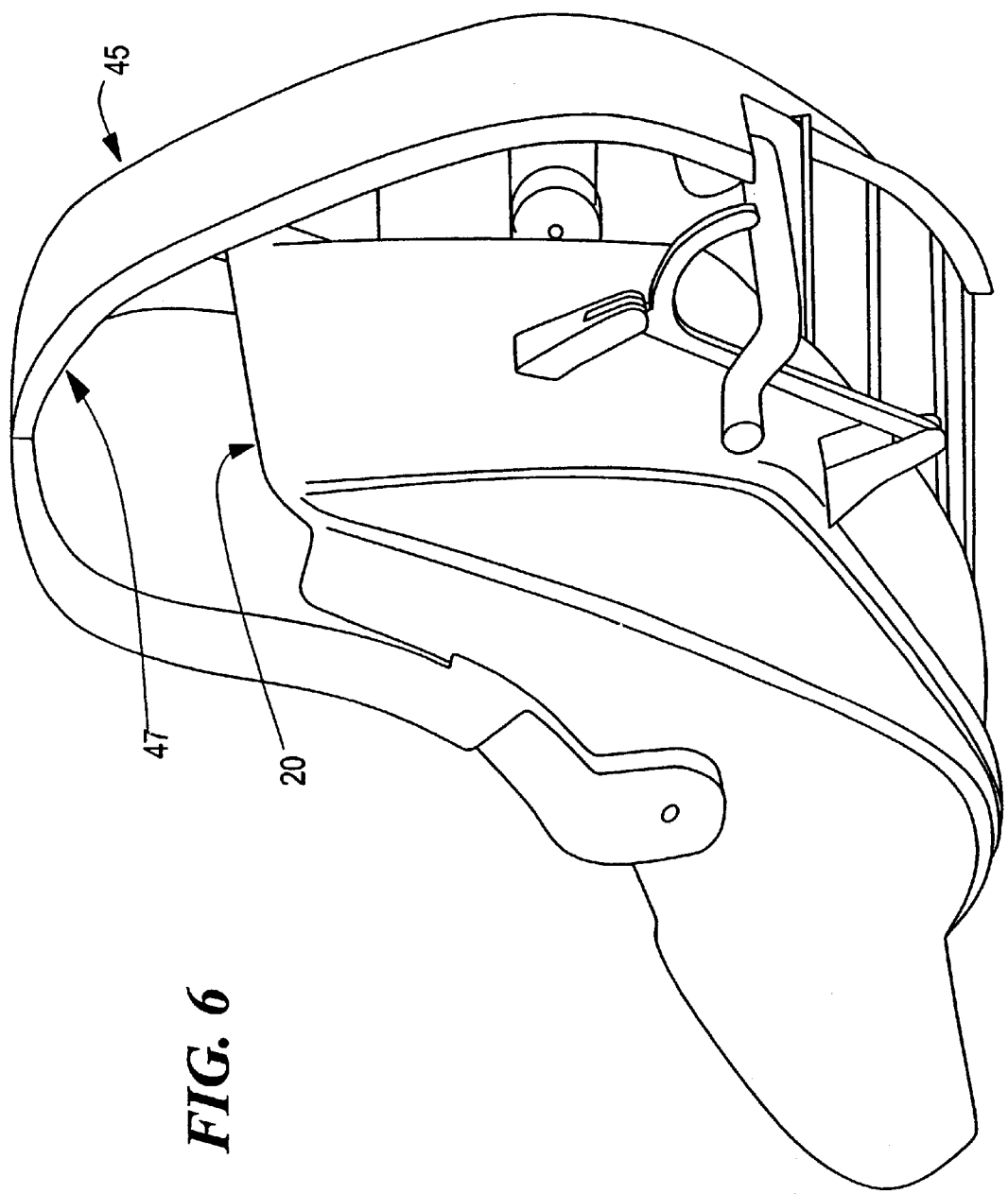
FIG. 6 is a further cutaway view of the shock absorbent barrier as incorporated in the frame.

The airbag deflector, illustrated in FIGS. 4–6, is formed as a composite panel having a compound curved back surface to deflect the air bag and absorb air bag and impact energy. The deflector includes a crumple zone construction that accomplishes the absorption. The composite panel of the deflector has an outer shell 46 and an inner shell 47. The interior region between the shells is filled with a collapsible ribbing reinforcement forming a cellular structure and a fill material, such as polystyrene. The cellular structure is preferably formed of orthogonal ribs or walls that define square or rectangular chambers and provide reinforcement. Cylindrical or hexagonal tubular members are disposed in abutting relationship within each chamber. FIG. 4 provides a cross section of the composite panel of the crumple zone. During a collision, the outer shell 46 deflects the airbag energy until the force causes the outer shell to deform and start to compress the expanded polystyrene foam fill 48. As the foam fill 48 compresses, it contacts the tubular members 49 which provide more resistance than the fill to the compression force. The force is blunted by the compression of the foam and the gradual resistance of the tubular members. In addition, orthogonal ribbing further spreads out shock waves.

FIG. 5. schematically illustrates further detail of the composite panel. The polystyrene fill has been omitted for clarity. The orthogonal walls 42 form cells 43 on the edge that have less volume than the interior cells 44 and are substantially filled only with the expanded polystyrene foam fill. The inner cells 44 support clusters of the honeycombed tubular members 49. The composite panel 45 buffers the infant away from any airbag or other impacting object such as the dashboard or a seat back. FIG. 6 illustrates how the airbag deflector 45, incorporating the crumple zone 48, is separated from the cradle providing even more buffering.

As shown in FIG. 7, during the largest motion of the frame and deflector 40 due to an impact, the deflector 40 has tensioned the seat belt 70. The seat 10 translates approximately four to five inches towards the front of the vehicle. The air bag 80 is at its maximum inflation. Further, the air bag 80 has been deflected above and over the infant 30 by air bag deflector 40 and thus air bag 80 does not come into contact with the infant 30 or infant cradle 20. In addition, the crumple zone 45 has absorbed and spread out the force of the airbag expansion protecting the child further. Any rebound from the impact will be dampened by the anti-kick bar 50 disposed at the front of the safety seat 10.

When the infant is placed in the rear seat facing rearward as illustrated in FIG. 7, the airbag deflector 40 with crumple zone 45 faces the seat back 60 of the unoccupied front passenger seat. If an impact flings the seat back 60 to the rear, the airbag deflector 40 with crumple zone 45 will absorb the force protecting the infant.

Figure 9:
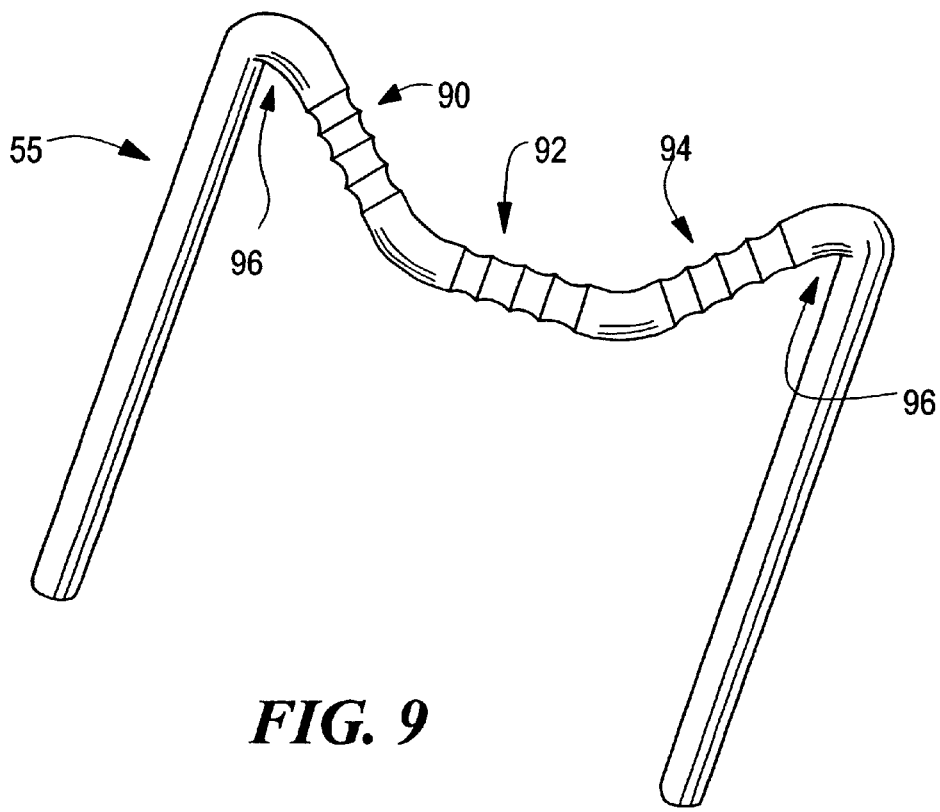
FIG. 9 is a view of a handle according to the invention.

In a further embodiment, the cradle 20 accepts a removable handle 55. This handle, as shown in FIG. 9, incorporates three gripping locations 90, 92, 94. The center grip 92 is positioned to facilitate straight lifting motions of the cradle. The right grip 94 is positioned to facilitate lifting the cradle with the right hand when the person lifting is on the left or carrying the cradle with the left hand. Similarly, the left grip 90 is positioned to facilitate lifting the cradle with the left hand when the person is on the right or carrying the cradle with the right hand.

Figure 10:
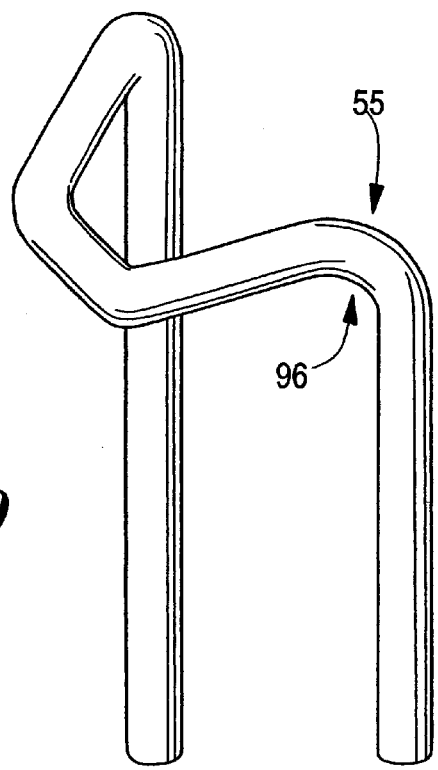
FIG. 10 is a enlarged view of the handle of FIG. 12 illustrating the elbow carrying surface.

The angle and placement of the grips allow the deadweight forces of the infant in the cradle 20 to be ergonomically translated through the hand and arm of the adult carrying the infant and cradle. When held by the right 94 or left grip 90, the cradle naturally pivots to swing close to the carrier's body. The bend 96 in the handle 55, FIG. 10, is adapted to facilitate carrying the cradle with the handle 55 tucked into the elbow. When the handle 55 is in the vertical position, the handle 55 angles downwardly inward so that the arm can be held against the body. While one embodiment is based on the posture of the average person, the removable nature of the handle allows special handles that accommodate individual needs to be provided.

Figure 11A:
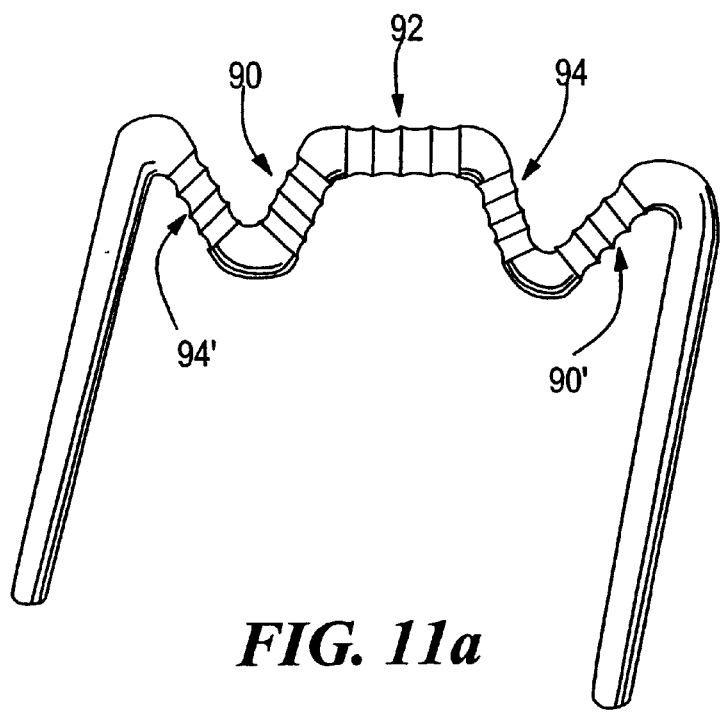
FIG. 11a is a front view of an alternate handle according to the invention.
Figure 11B:
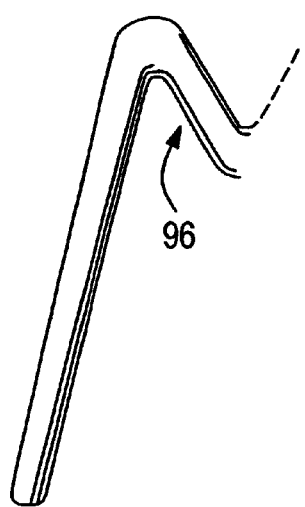
FIG. 11b is a side view of an alternate handle according to the invention.

FIG. 11a illustrates two alternate configurations of grips (90,92,94 or 90',92,94') on a handle that maintains the ergonomic placement. The side view, FIG. 11b illustrates the displacement of the gripping surfaces from the sidebar portion of the handle allowing for the natural lie of the cradle. Either embodiment can accommodate the use of an elbow in the bend of handle.

While the handle accommodates lifting the cradle with one hand, the single-handed release mechanism 32 makes it practical to use this capability in removing the cradle and infant from a car. A locking mechanism must be configured so that very little alignment is required in order to position and lock the cradle within the frame. FIG. 12 illustrates one such lock mechanism. In this lock, The cradle 20 has integral to it a set of protuberances 120 facing the frame 10. The frame is fitted with a corresponding set of locking paws 122, which in FIG. 12 are engaged, and holding the cradle 20 securely. The paws 122 have a hook end 144, a ball end 146, and a pivot point 142. Paws are interconnected in pairs by springs 148 to assure synchronized action. In order to disengage the paws, a mechanism moves the ball end 142 to the position shown in FIG. 13.

Any number of locking mechanisms may be employed for releasably securing the cradle to the frame, as long as, once the cradle is inserted within the frame, the seat is locked in place and the lock cannot be released accidentally. In conventional car seats, the release is implemented by for instance, depressing two levers, one on each side of the seat.

A duplicated single-handed release mechanism provides the convenience of being able to release the cradle from either side with one hand while providing the safety interlock and release needed to assure that the cradle does not unlock accidentally. In the child safety seat of the invention, the release mechanism is replicated on each side of the frame and either side can complete the action. To prevent accidental release of the locking mechanism, the release mechanism requires two actions to disengage the cradle from the frame.

FIGS. 12 and 13 illustrate one side of a symmetric lock and release mechanism utilized in a preferred embodiment. In FIG. 12 the mechanism is locked. In FIG. 13 the mechanism is released. To unlock the mechanism, the central button 128 of the release handle 140 is pushed in. This button is connected to the child lock shaft 130 that is concentrically mounted within the main shaft 126. Connected to the inward end of the child lock shaft 130 is a crossbar 132. The crossbar extends through the main shaft via a slit 134 in the main shaft. The crossbar 132 normally rests against lock bar 136, which prevents the main shaft 126 and the child lock shaft 130 from turning. When the child lock button 128 is pushed in, the crossbar 132 is pushed to the position in FIG. 13, displaced from the lock bar 136. Now handle 140 can be turned.

The handle coupler 150 to the main shaft 126, turns the main shaft 126 rotating the asymmetrically mounted wing 124. As the wing 124 moves from the position shown in FIG. 12, to that in FIG. 13, the ball end 146 of the paw 122 is displaced. The paw 122 rotates around the pivot point 142 releasing the protuberances 120 on the cradle 20. The crossbar 132 and the main shaft 126 are fitted with torsional springs 138 and not shown, so that the system returns to locking position (FIG. 12) as soon as the handle is released.

FIG. 14 illustrates an alternate push and swing release mechanism 32. With one hand, the operator pushes in on handle 110 to unlock the mechanism and then swings the pushed-in handle until it engages detent 112 to release it. Once the cradle 20 is released, it may be lifted from the frame. In one embodiment, the release handle 110 remains in the detent 112 indicating whether the cradle is locked in the frame. It will be understood that the push and swing release is illustrative of many stepped motions that can accomplish the "unlock and release" sequence.

The convertible child seat 10 can also be used in a forward facing orientation. As shown in FIG. 15, in this embodiment 10' the cradle 20 is disposed at the second end of the frame/deflector 25/40. The seat is mounted in the vehicle in a manner similar to the embodiment 10, with the difference that the occupant 30 is now forward facing. Since the child is usually larger, a larger cradle will typically be substituted for the original cradle used in the rearward facing embodiment. This larger cradle will usually not incorporate the handle since a child of this size is carried independent of the cradle. The forward facing orientation is also applicable in the rear seat as shown in FIG. 16. In both of these placements, the airbag deflector and crumple zone continue to spread and absorb the shock of an impact.

Figure 17:
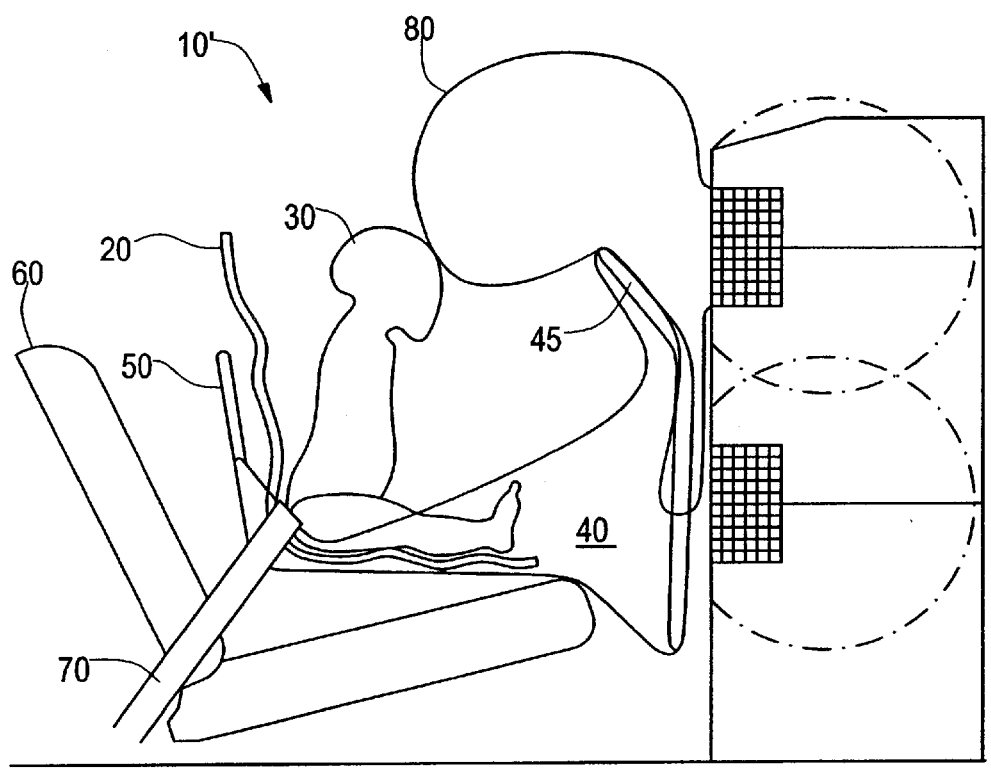
FIG. 17 is a diagrammatic side view of the child safety seat of FIG. 15 with the air bag fully inflated.

As shown in FIG. 17, at a time of maximum force on the car seat, the child 30 and seat 10' start to translate towards the front of the vehicle. The seat belt 70 is at its elastic limit and the inflating air bag 80 expands over the top of the deflector 40 and encounters the head of the infant 30 thus preventing and cushioning further forward movement of the infant 30 relative to the vehicle. The crumple zone reduces the effects of the impact by deforming as needed.

The convertible child safety seat provides protection for an occupant in either a forward facing or rearward facing orientation. The convertible child safety seat also protects the occupant from an inflating air bag when the seat is installed in the front passenger-side seat of a vehicle equipped with a passenger-side air bag and from a collapsing front seat when installed in the rear seat. The cradle is removable from the frame of the seat using a single-handed safety release mechanism. A handle, adapted to be gripped by either hand facilitates removal and carrying of the cradle.

Figure 18:
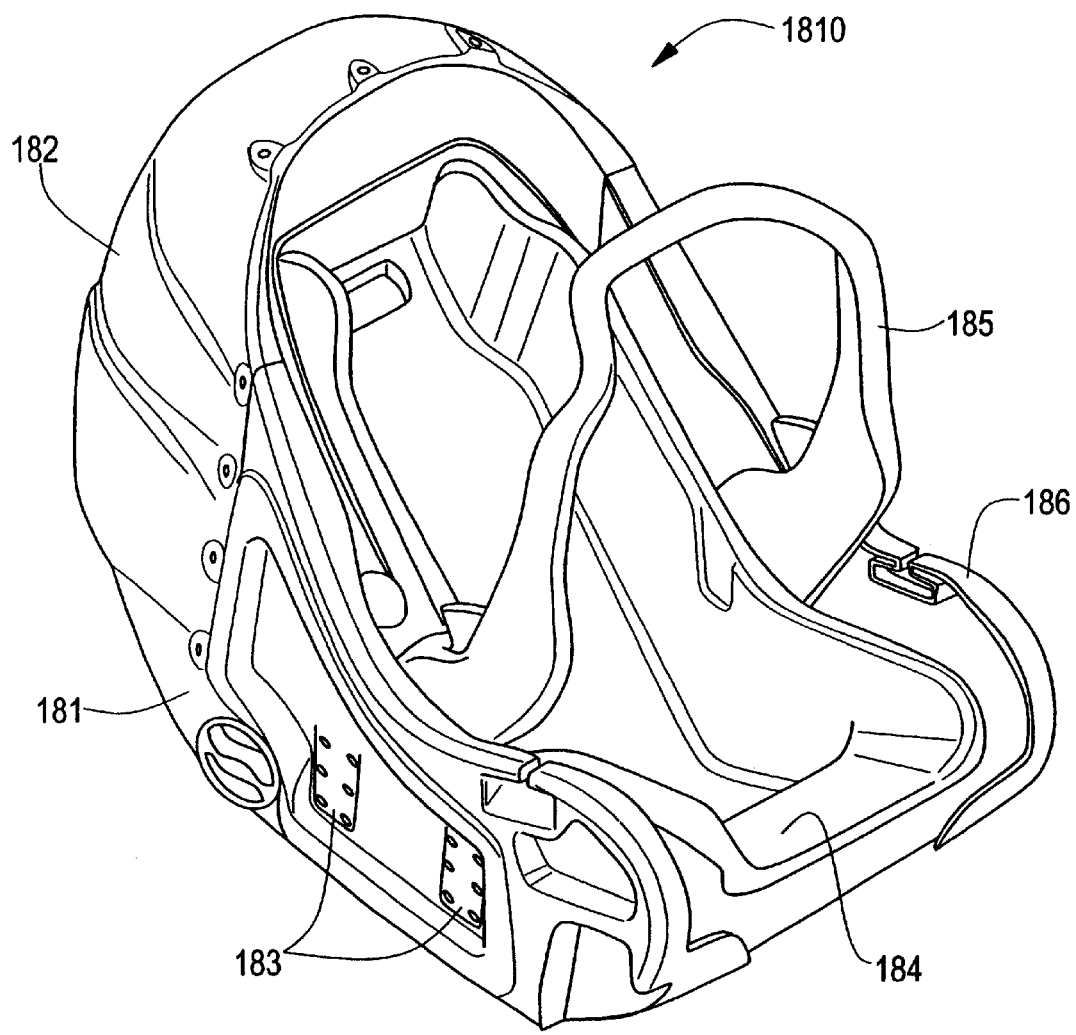
FIG. 18 is a view of an embodiment of an airbag compliant infant seat according to the invention.

An airbag compliant rear-facing infant seat (ACIS) embodiment that incorporates these principles is illustrated in FIG. 18. The cradle 184 of this ACIS 1810 is narrower and has higher sides than other models and comes with guidelines, based on height and weight, that transition an infant out of the ACIS 1810 earlier than one would be transitioned from other infant seats. The narrowness and guidelines permit greater protection for the infant from the shocks generated by impacts. The ACIS 1810 may be manufactured of tubular aluminum, thermoformed plastic, machined plastic or injectable plastics, with injection molding of most of the parts as a preferred practical and cost effective manufacturing method.

The ACIS 1810 is composed of 2 major components: the base 186 and the cradle 184. The base 186 is adapted to be semi-permanently mounted to the seat of a vehicle, while the cradle 184 is removable, but may be easily and securely mounted to the base 186. It is intended that the base 186 remain in the vehicle, while the infant is transported between the vehicle and other destinations securely held by the cradle 184.

Figure 19:
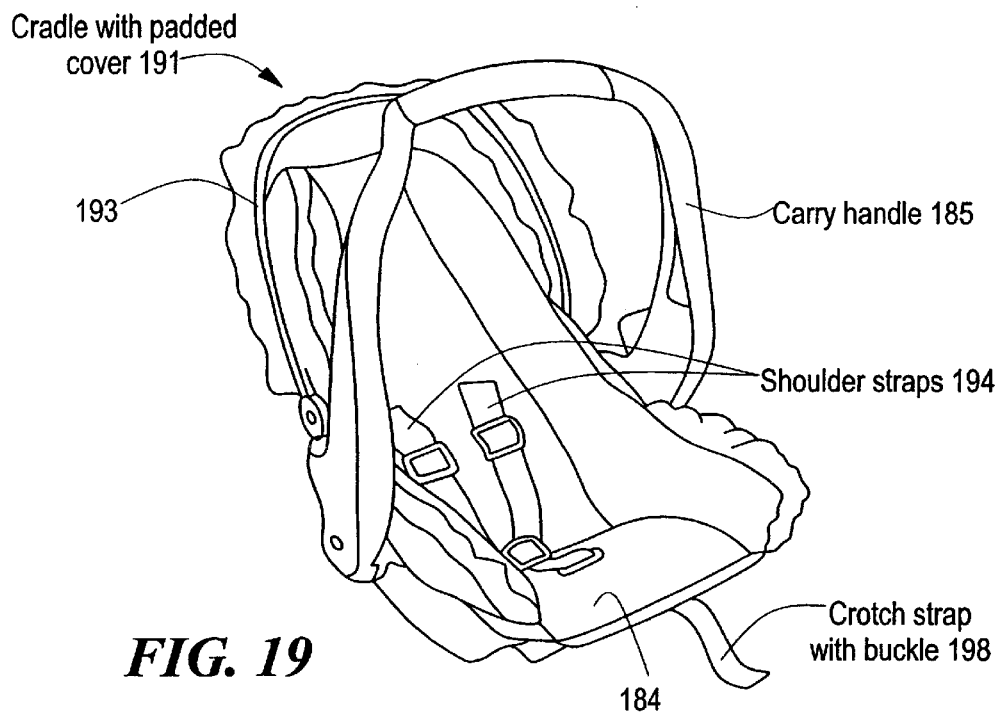
FIG. 19 is a view of an embodiment of a cradle for the seat of FIG. 18.

A cradle with padding 191, as shown in FIG. 19, is an infant carrier type cradle 184 adapted to fit in the base 186. It is narrower than the generally available cradle used in similar infant seats. This narrowness limits the extent of movement of an infant during an impact. Further, it is suggested that an infant transition to a larger seat when the infant's head extends past the top 193 of the cradle 191. A high quality harnessing system 195 incorporating shoulder straps 194 and a crotch strap 198, as illustrated in FIG. 19, installed correctly and used consistently will assure maximum benefit from the safety features of the ACIS 1810. The handle 185 is normally in the position shown in FIG. 1 while the cradle 184 is in the base 186. The handle 185 in this position can act as a rebound limiter for the most extreme of impacts. The cradle 184 is held to the base 186 by a clamping mechanism that grips a structural connection between the cradle body 184 and the handle 185 as detailed below.

The base 186 is composed of a foundation 181 and a canopy 182 integrally connected together. This base 186 works with the installed seat(not shown)in the car to disperse the shock wave created by the interaction with the airbag or barrier contact, isolate the shock away from the child's head, neck, and thorax, and at the same time prevent the front seat back from crushing the child. The canopy 182 receives the first impact from either striking a part of the vehicle or from an airbag. The foundation 181 receives any part of the shock not handled by the canopy 182 and dissipates it to protect the infant.

Figure 20:
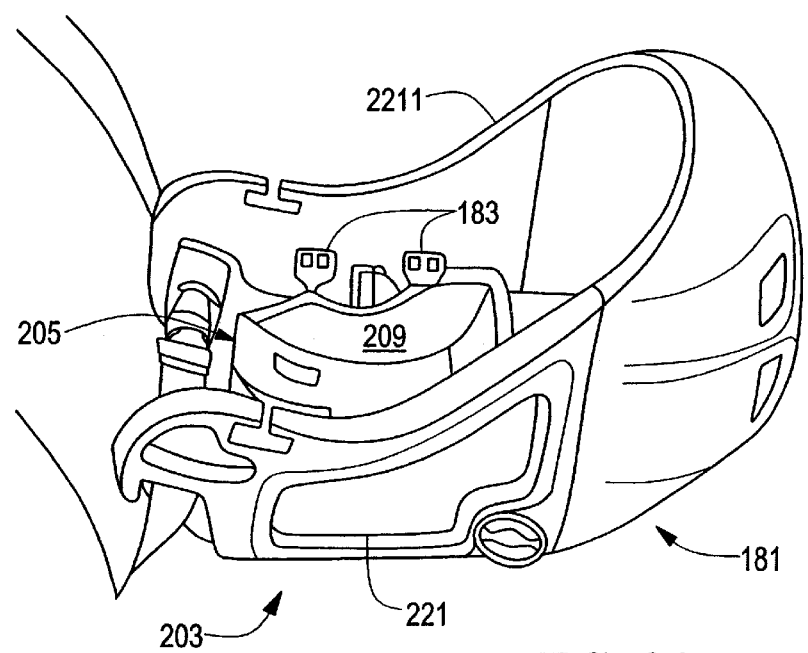
FIG. 20 is a diagram of a base for the seat of FIG. 18.
Figure 22:
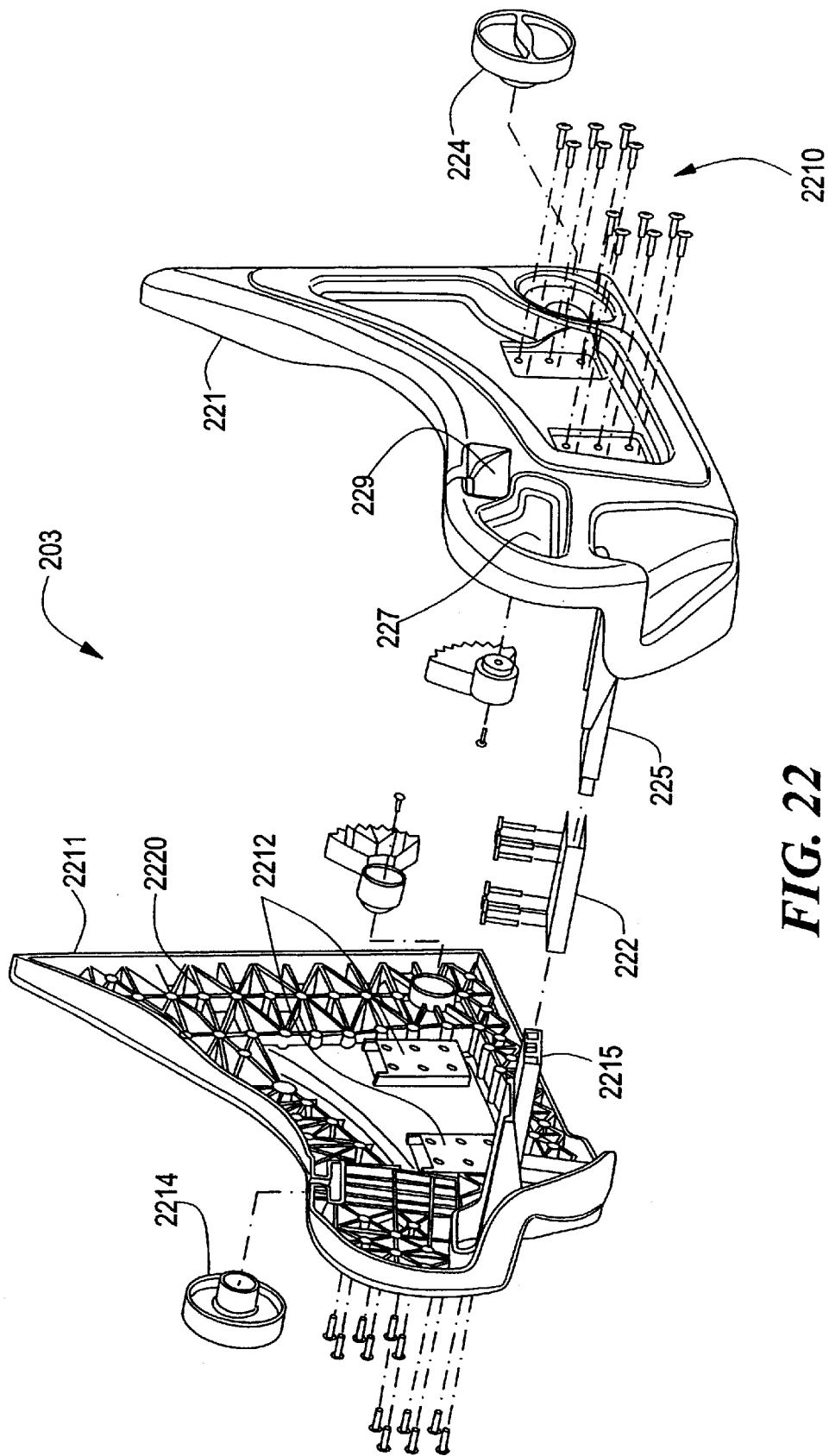
FIG. 22 is an exploded view of a frame for the base of FIG. 20.

The foundation 181, as shown in FIG. 20, is composed of a frame 203 and a suspension assembly 205. The frame 203, as illustrated in FIG. 22 comprises two side panels 221, 2211 each including a crossbar brace 225, 2215. The crossbar braces 225, 2215 are joined by the crossbar retainer 222 to form the frame 203. The side panels 221, 2211 incorporate openings 227, 229 to allow seat belts to secure the base 186 to the vehicle seat. The side panels 221, 2211 are formed of structurally rigid polypropylene (PP) or similar material that is reinforced by extensive ribbing 2220 as shown to allow energy to propagate across the panels to the vehicle seat. The need for ribbing is inversely proportional to the modulus of the PP used.

The suspension assembly 205 comprises a set of shock absorbers 183, suspending a holder 209 between the side panels 221, 2211 of the frame 203, and a latching mechanism, detailed below, to fasten the cradle 184 to the holder 209. The shock absorbers 183 mount high enough on the side panels 221, 2211 that the bottom of the holder 209 is a distance above the bottom of the side panels. This placement allows room for downward deflection of the holder 209 and cradle 184 during an impact.

Figure 21:
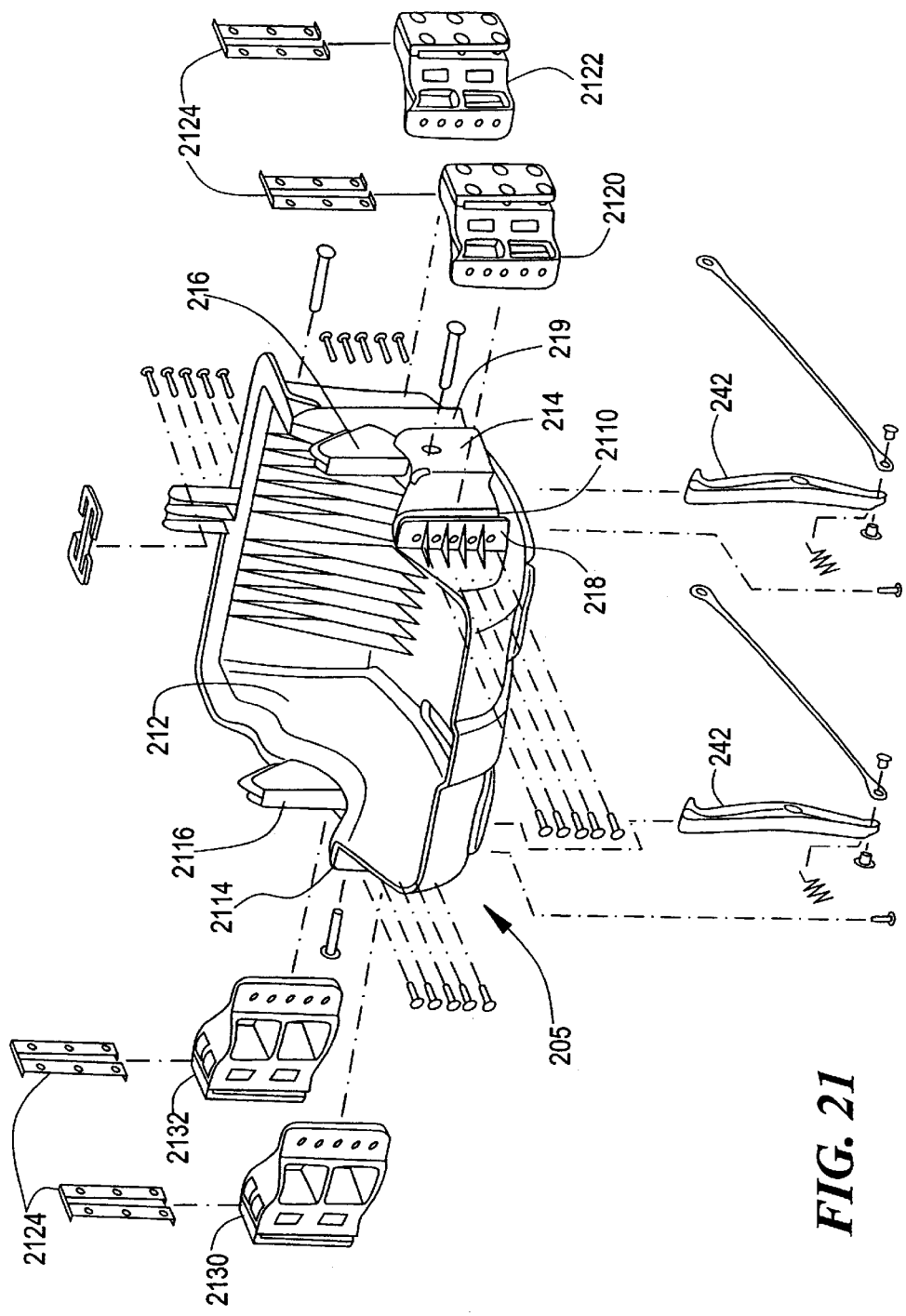
FIG. 21 is an exploded view of a suspension mechanism for the base of FIG. 20.

As seen in FIG. 21, the holder 209 incorporates a scooped basin 212 for receiving the cradle 184 and a pair of side arms 214, 2114. The scooped basin 212 is reinforced by ribbing to be as strong as the cradle 184. The side arms 214, 2114 provide mounting surfaces 218, 219 for connecting the shock absorbers 183 to the holder 209. In addition, the side arms 214, 2114 incorporate latching mechanism backstops 216, 2116 and access passages (not shown) for the latching mechanism paws 242 described below.

One implementation utilizing the shock absorbers 183 is shown in more detail in FIG. 21. Here, two pairs of shock absorbers 183, termed the front absorbers 2120, 2130 and rear absorbers 2122, 2132 span between the holder 209 and the side panels (not shown). When the front and rear absorbers are identical and exhibit the same stiffness, the front and back of the holder 209 move together. When the characteristics differ among the absorbers, movements that are more complex are possible. In particular, where the front shocks 2120, 2130 are stiffer than the rear shocks 2122, 2132, the more pliable absorbers 2122, 2132 will pivot around the firmer absorbers 2120, 2130. The pivoting allows the holder 209, and attached cradle 184, to rotate as well as translate while the shock pulse to the ACIS 1810 is being dampened.

Figure 23B:
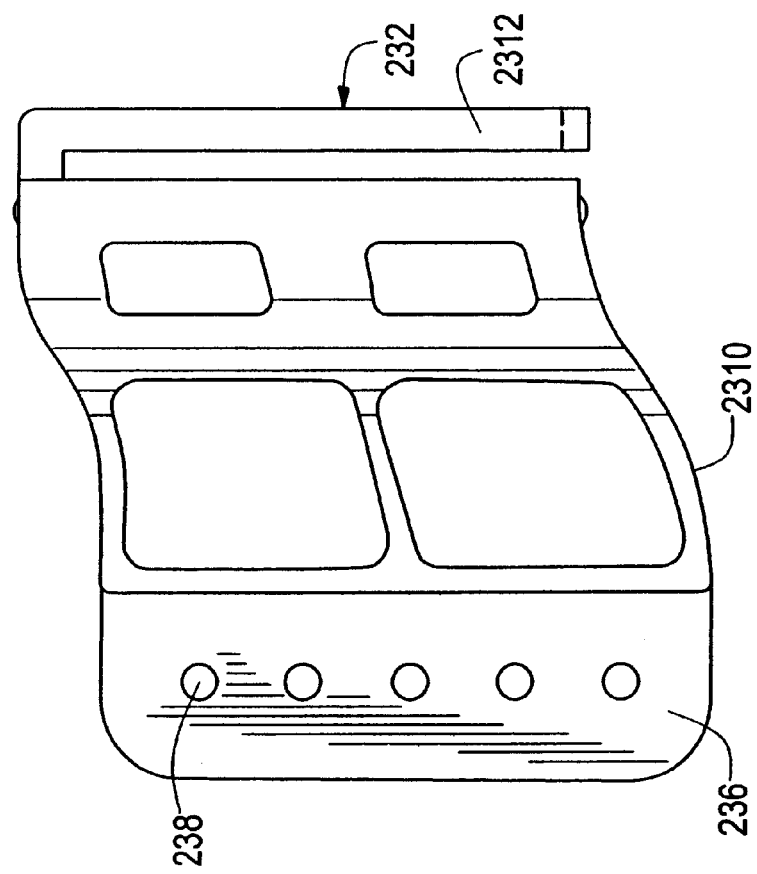
FIG. 23b is a side view of a shock absorber for the suspension mechanism of FIG. 22.
Figure 23A:
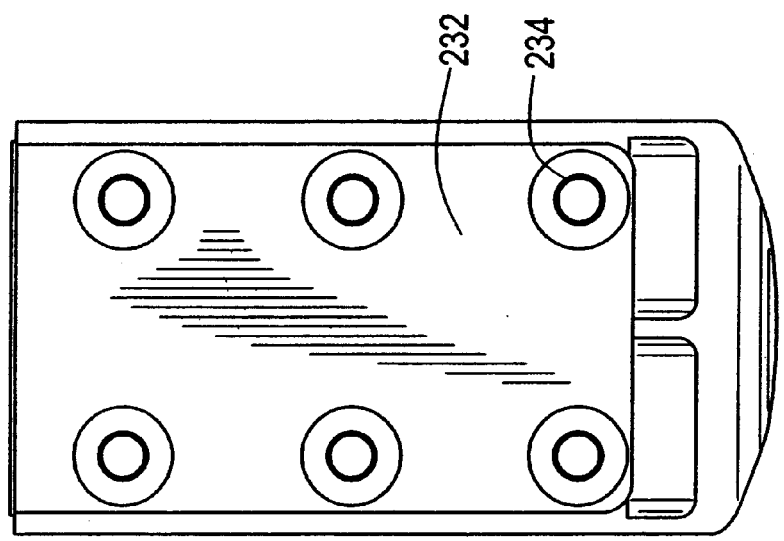
FIG. 23a is a front view of a shock absorber for the suspension mechanism of FIG. 22.

The front face 232 of shock absorbers 183 is illustrated in FIG. 23a, showing a pattern of mounting holes 234 sized to allow passage of mounting bolts 2210. Each front face 232 slides into a mounting pocket 2212 on the inside of a side panel of the frame 203. The sides of the mounting pockets 2212 are tapped to capture the mounting bolts 2210. The side view of shock absorbers 183 in FIG. 23b illustrates the front face tab 2312.

The rear side panel 236 of the shock absorbers 183 similarly fits within a reinforced channel 2110 in the front 218 and rear 219 of the side arms 214, 2114. These fastening mechanisms securely fasten shock absorbers 183 to holder 209 while allowing the flexure of the shock absorbers 183. Other fastening mechanisms, as are known in the art, may be employed to connect the shock absorbers 183 with similar effect. The remainder of the body 2310 of shock absorbers 183 dampens the dynamic loading on the infant while spreading the shock pulse out over time. The shocks absorbers 183 allow the cradle 184 to move within the physical constraints of the base 186, and specifically the canopy 182, without colliding with the canopy 182.

Figure 24A:
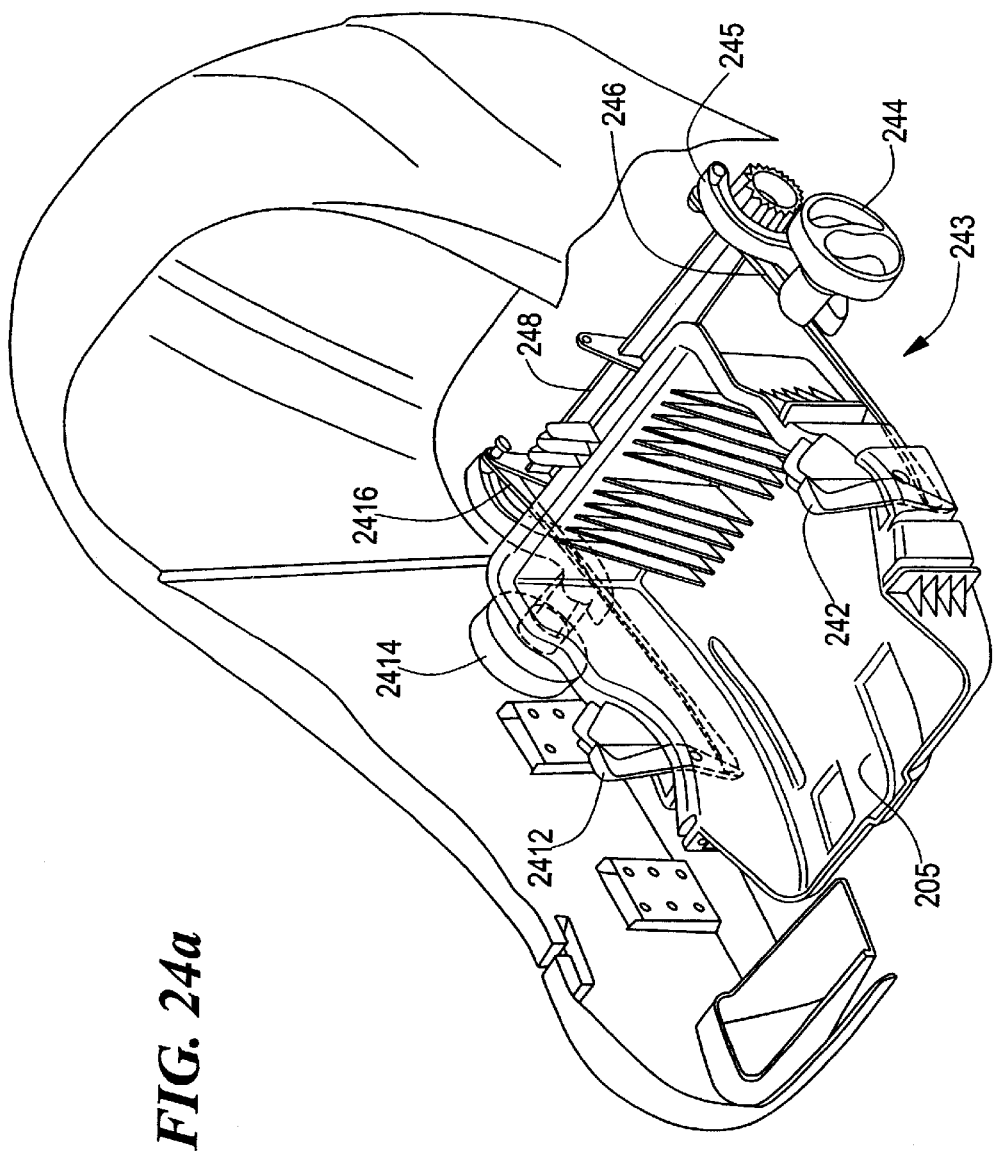
FIG. 24a is an view of a latching mechanism in the closed position for the seat of FIG. 18.
Figure 24B:
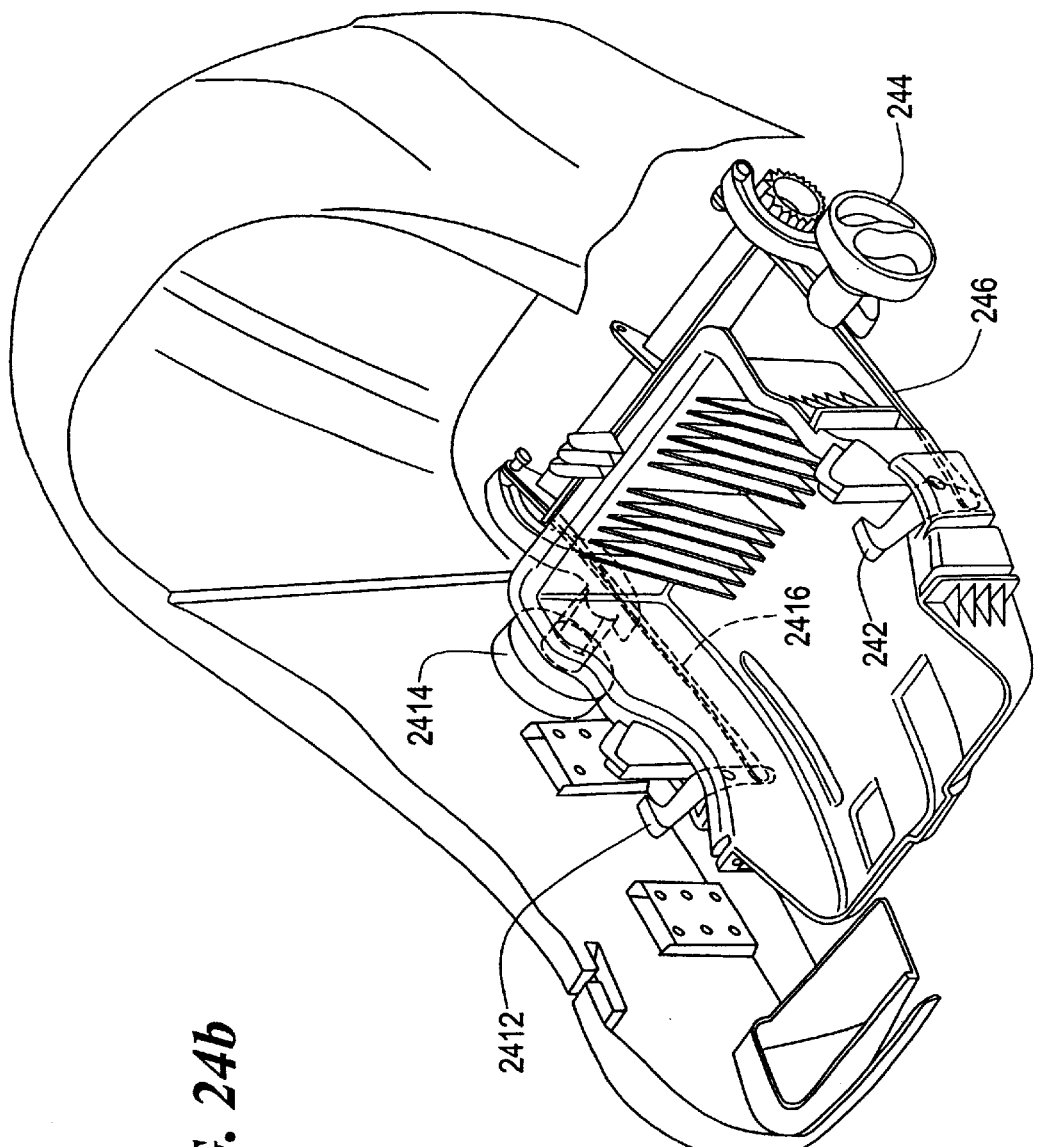
FIG. 24b is an view of a latching mechanism in the open position for the seat of FIG. 18.

The cradle 184 locks into the suspension mechanism 205 using a latching mechanism 243 as shown in FIG. 24. Alternate locking mechanisms may be employed for releasably securing the cradle to the frame, as long as, once the cradle is inserted within the frame, the seat is locked in place and the lock cannot be released accidentally. The cradle latching mechanism 243 consists of a set of paws 242, 2412 that latch onto a structural member (not shown) that connects the handle 185 to the cradle 184. Either of the knobs 244, 2414 on the sides of the base 181 can actuate the set of paws 242, 2412. Linkages 246, 2416, implemented utilizing rods, cables or the like, connect the paws 242, 2412 to the translation bar 248 to open the normally closed paws 242, 2412. The mechanism 243 is preset to automatically return to a state in which the paws 242, 2412 are closed as shown in FIG. 24a. Positive stops 245, 2415 built into the mechanism 243, constrain the release knobs 244, 2414 to rotate in one direction and only to the point where the mechanism 243 is fully open as shown in FIG. 24b.

The automatic return allows for hands free insertion of the cradle 184 in the mechanism 243 because the mechanism 243 opens under the weight of the cradle 184 and then closes automatically. A slot (not shown), incorporated in the stem of each of the knobs 244, 2414, frees the moving linkage from rotating the knob not being turned externally. This independent operation reduces the rotational force that needs to be applied to the active knob to release the cradle 184. To activate the release mechanism, one of the knobs 244, 2414 is pushed in engaging with the positive stops 245, 2415. Once engaged, the turning knob 244, 2414 can turn the translation bar 248 that in turn draws the paws 242, 2412 open.

In FIG. 24b, the cradle latching mechanism 243 is shown in an open position. Knob 2414 has turned to activate the linkages 246, 2416 opening the paws 242, 2412. The open paws allow the cradle 185 to be removed from the base 207. Knob 244 remains in the same position as shown in FIG. 24a illustrating the effect of the independent operation of the linkages.

Figure 25:
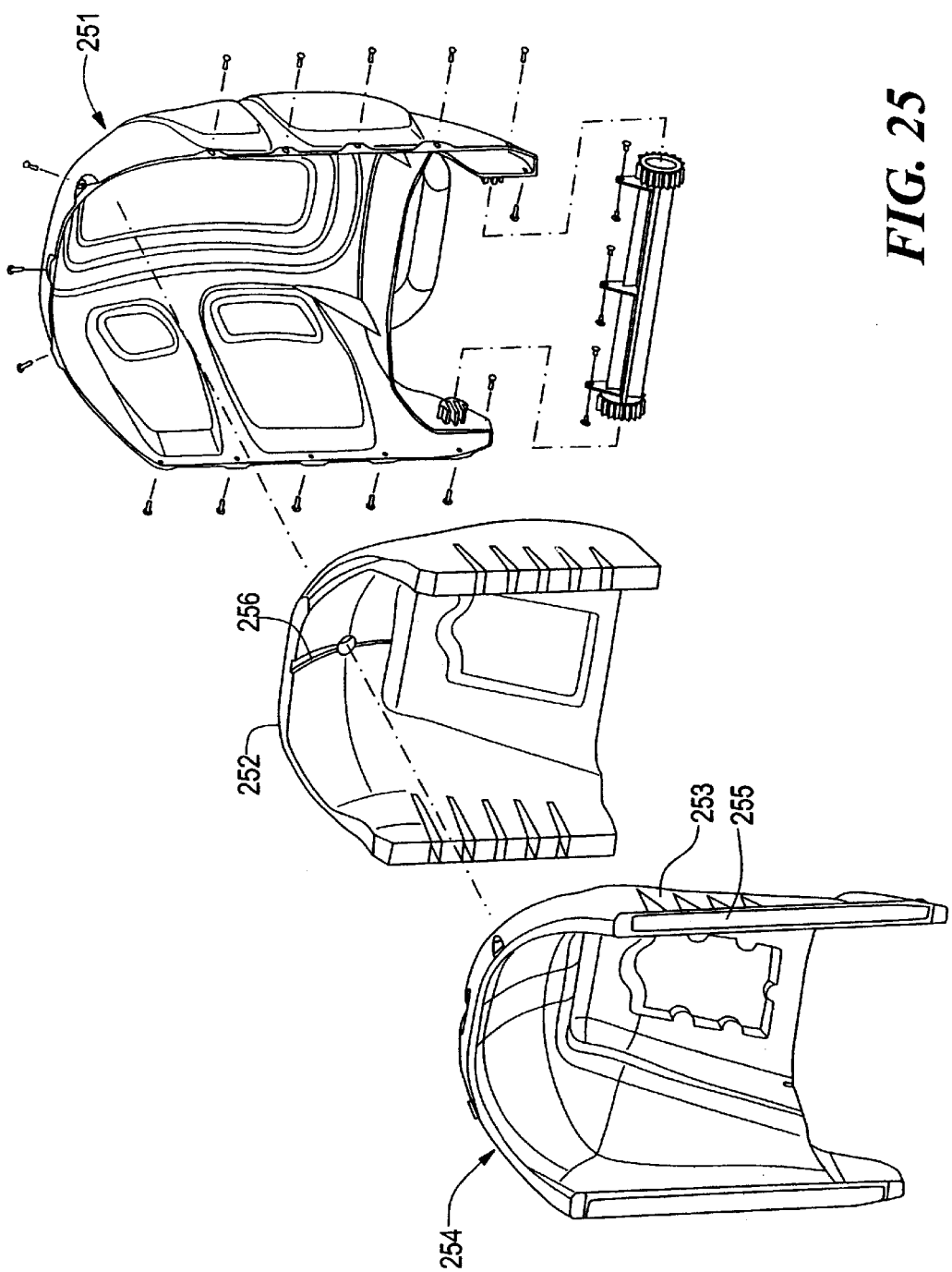
FIG. 25 is an exploded view of a canopy for the base of FIG. 20.

The canopy 182 is composed of three primary parts as shown in FIG. 25. The fascia panel 251 forms the outside of the canopy 182 facing the automobile dash panel and is typically made of a thin-walled polypropylene (PP) or other plastic with a high rubber-like content that is highly deformable. In one embodiment, the fascia panel is made of 0.08" thickness polystyrene. Although the fascia panel 251 is the first part of the ACIS 1810 to feel an impact during a collision, its primary purpose is to hold the remaining parts of the canopy 182 together. The exterior surface of the fascia panel 251 is detailed primarily to provide purchase for handling and for aesthetics rather than to reinforce the panel.

The foam panel 252 is sandwiched between the fascia panel 251 and the back canopy 253. The foam panel 252 reduces the impact load to the infant significantly and transfers energy uniformly to the back canopy 253. The foam has surface ribs 256 across its surface to improve shock absorption and stretch out the shock wave. The foam panel 252 is shaped to assure that the alignment with the back canopy 253 is uniform and precise. Different types of foam may be used in the panel including Expanded Polystyrene (EPP), EPP closed cell foam, urethanes etc.

The back canopy 253 encompasses the rearmost portion of the base. It is structurally rigid relative to the EPS foam panel 252 and the fascia panel 251. In one embodiment, the back canopy 253 is formed of polypropylene. It is physically attached to the side panels 224, 2214 via an integrating joint such as a welded joint. This integrating joint allows the force transferred to the back canopy to be transmitted to the rest of the base homogeneously. The foam panel 252 is formed to conform to the shape of the back canopy 253, thereby improving the transmission of force. The fascia 251 and back canopy, with the foam panel 252 compressed inside, are fastened together across the top 254 and sides 255 of the canopy 253.

The force transmitted to a ACIS 1810 when the vehicle is in a front-end collision can be deflected from the occupant by energy absorbing measures. The energy absorbing methods available to a safety seat are the movement of the seat in various directions and friction forces. In terms of movement, the infant seat can move horizontally within the limits of the automobile seat and seatbelts, vertically down depending on the stiffness of the automobile seat cushion, vertically up within the limits of the seatbelts, and rotationally about a point. Friction forces that can absorb energy include the crush force on padding between components of the seats, deformation of components of the seat, and heating of components because of the other friction forces. In the any one embodiment, energy dissipation is accomplished using a variety of these methods.

When the canopy receives a force on the fascia panel 251, the panel 251 deforms absorbing some of the energy and transfers the majority of the force to the foam panel 252. The foam panel 252 compresses, absorbing a significant portion of the energy to dampen the force pulse, and transfers the remaining force uniformly to the back canopy 253.

Figure 26:
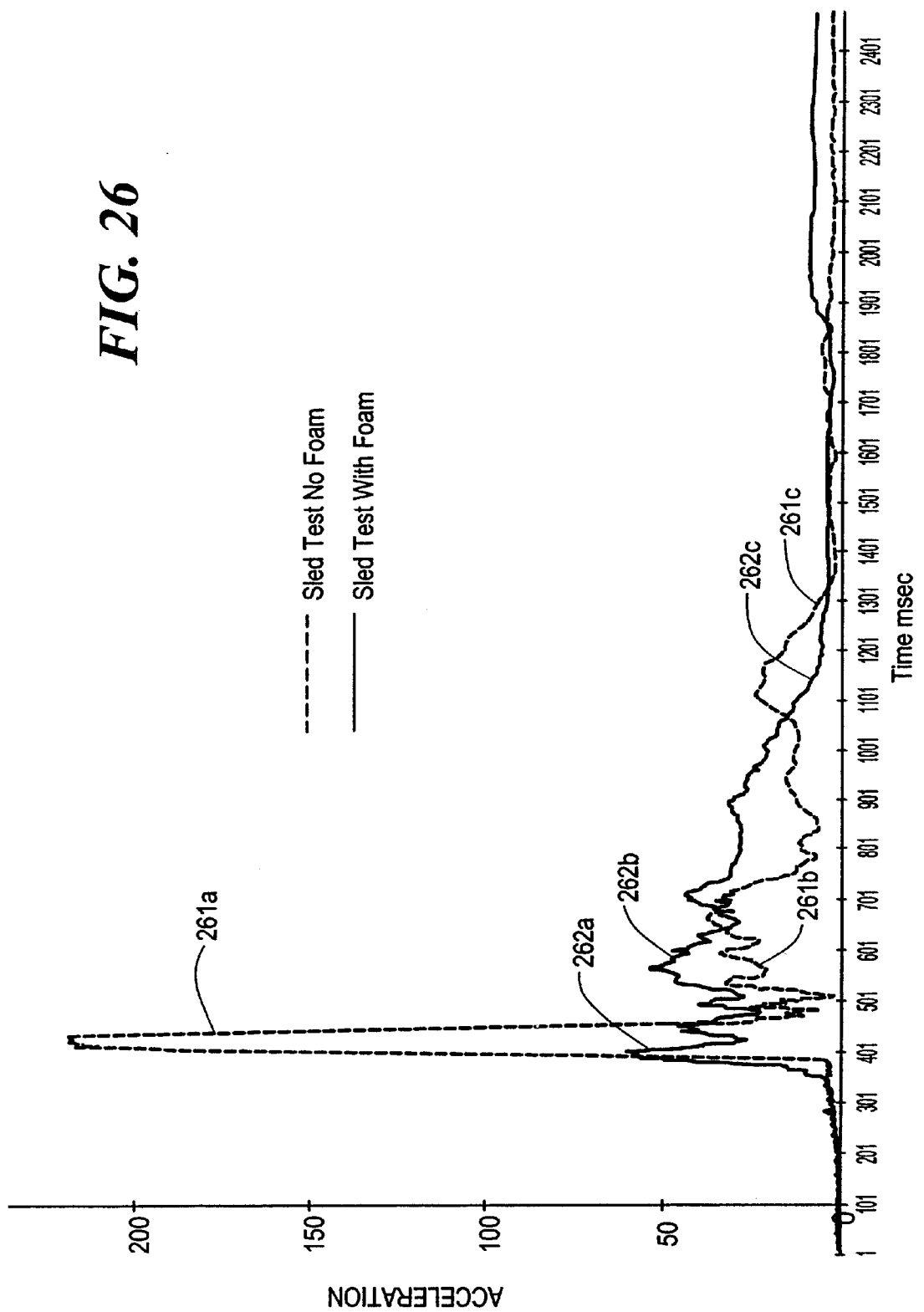
FIG. 26 is a graph of the acceleration at the frame with and without a foam insert in the canopy of FIG. 25.

FIG. 26 illustrates the shape of the force pulses transmitted to the ACIS 1810 and in particular, the difference in force to the foundation 181 based on the presence or absence of the foam. Trace 261 illustrates the acceleration force felt at the foundation 181 when a foam panel 251 is deleted from the canopy 182 structure. A narrow extreme pulse 261a is experienced approximately 400 ms after the impact, with a wider secondary pulse 261b of much diminished intensity occurring between 500 and 700 ms after the impact. The effect of the impact is essentially dissipated 261c within 1300 ms. In contrast, with the foam panel 251 installed, the sharpest pulse 262a, measured at the same place, is less than one quarter the undamped pulse 261a. The secondary pulse 262 is larger than in the undamped case, but is still less that the primary damped pulse 262a. The effect of the impact is essentially dissipated 262c by 1150 ms, more quickly than in the undamped case.

The back canopy 253, being integrally coupled to the foundation 181 and more structurally rigid that the other components of the canopy 182, bends and deforms under the forces received, transmitting some of the energy to the rest of the base, including the side walls 204.

In impact dynamics terms, the shocks produce a combined stress state, with normal, shear and bending moments. The specific material selection afforded by plastics allows the ACIS 1810 to utilize varying stiffness of shocks 183 from baby front to baby back. This difference in stiffness converts the direct straight-line energy of airbag impact and infant deceleration into both straight-line and rotational motion. Since the infant is held securely to the cradle within the base, the full benefit of the shock absorptive capabilities of the canopy, side panels, and shock absorbers are afforded to the infant in the cradle.

When an automobile in which the ACIS 1810 is mounted in the front seat suffers a frontal collision, there are three sources of force on the seat, the deceleration from the collision, the force from the impact of seat on the dashboard and the force from the airbag's explosive inflation. When the ACIS contacts the dash or the airbag, the impact energy is transferred through the canopy and foundation into the automobile seat cushions. The most likely dash impact point is on the fascia panel 251 and direct horizontally backward. The most likely airbag impact point is higher on the fascia panel 251 and directed both horizontally backward and downward.

In both cases, the fascia panel deforms transferring most of the energy to the foam panel 252. The foam panel 252 compresses both vertically and horizontally, spreading the energy out across the back canopy and decreasing the transmitted force. The result of these compensating actions is that the child in the cradle is shielded from the most extreme aspects of the impacts before the suspension mechanism is used. The force causes the frame of the safety seat to be significantly pushed down into the car seat cushion, but the shock absorbers buffer the cradle from much of this motion further dissipating energy in the process. The result of these compensating actions is that the child in the cradle is displaced minimally and never leaves the protective confines of the base.

Having described preferred embodiments of the invention it will now become apparent to those of ordinary skill in the art that other embodiments incorporating these concepts may be used. Accordingly, it is submitted that the invention should not be limited by the described embodiments but rather should only be limited by the spirit and scope of the appended claims.

We claim:

1. A base providing a mounting space for a cradle comprising:

a foundation constructed of a deformable material comprising a back canopy wrapped around a back of the mounting space for said cradle, and a frame forming sides and a bottom of said foundation;

a suspension assembly comprising a cradle holder, incorporating a latching mechanism to hold said cradle, and shock absorbers suspending said cradle holder from said sides of said frame; and a canopy comprising a foam panel constructed to conform to an external side of said back canopy and a fascia panel of a thin deformable material adapted to hold said foam panel tightly against said external side of said back canopy, wherein said base provides an energy absorbing and dissipating function.

2. The base according to claim 1 wherein said shock absorbers comprise a pair of front shock absorbers and a pair of rear shock absorbers, said front shock absorbers stiffer than said rear shock absorbers.

3. The base according to claim 1 wherein said shock absorbers have a same geometry and a different stiffness chosen to allow an installed cradle to rock toward said back canopy in response to an impact directed at said fascia panel.

4. The base according to claim 1 wherein said sides of said frame are ribbed to improve the uniformity of transmission of energy.

5. The base according to claim 1 wherein said foam panel incorporates vertical ribs that improves an energy absorptive property of said foam panel.

6. A method to protect an infant from the energy of an auto impact and airbag activation comprising:

placing said infant in a rear-facing safety seat installed in a front seat of an automobile, said rear facing safety seat comprising a base made as a canopy and a foundation integrally joined and a dissipating panel attached to said canopy, said base adapted to be secured to the seat of said automobile, and a cradle having a back portion, a seat portion, sides to said back and seat portions and a handle attached across said sides, wherein a latching mechanism incorporated in said base removably secures said cradle to said base by grasping a structural element between said handle and said sides;

allowing a dashboard and an airbag to impact said safety seat on a fascia panel forming an outside layer of said dissipating panel;

deforming said fascia panel to absorb a first portion of an impact force;

transmitting a second portion of said impact force to a foam panel forming an inner layer of said dissipating panel;

compressing said foam layer to absorb a third portion of said impact force and to transmit a fourth portion of said impact force to said canopy;

deforming said canopy and said integrally joined foundation to absorb a fifth portion of said impact force;

flexing a set of shock absorbers disposed between said foundation and said cradle to dissipating a sixth portion of said impact force; and moving said cradle in a rotational and a translational manner within said base dissipating a last portion of said impact force.

* * * * *